(12) United States Patent
Hashimoto et al.

(10) Patent No.: US 7,522,983 B2
(45) Date of Patent: Apr. 21, 2009

(54) VEHICLE INTEGRATED CONTROL SYSTEM

(75) Inventors: Yoshiyuki Hashimoto, Nishikamo-gun (JP); Masanori Hirose, Brussels (BE); Hirotada Otake, Susono (JP); Hideki Takamatsu, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 360 days.

(21) Appl. No.: 10/583,661

(22) PCT Filed: Dec. 13, 2004

(86) PCT No.: PCT/JP2004/018968

§ 371 (c)(1),
(2), (4) Date: Jun. 21, 2006

(87) PCT Pub. No.: WO2005/063524

PCT Pub. Date: Jul. 14, 2005

(65) Prior Publication Data

US 2007/0169007 A1    Jul. 19, 2007

(30) Foreign Application Priority Data

Dec. 25, 2003   (JP) .............................. 2003-430233

(51) Int. Cl.
*G06F 19/00* (2006.01)
(52) U.S. Cl. ............................. 701/48; 701/33; 701/36; 340/438; 340/439
(58) Field of Classification Search .................. 701/29, 701/33, 35, 36, 48; 340/438, 439
See application file for complete search history.

(56) References Cited

U.S. PATENT DOCUMENTS

| 5,351,776 | A | 10/1994 | Keller et al. |
| 5,991,669 | A | 11/1999 | Dominke et al. |
| 6,738,697 | B2 * | 5/2004 | Breed .......................... 701/29 |
| 2002/0016659 | A1 | 2/2002 | Tashiro et al. |

FOREIGN PATENT DOCUMENTS

| EP | 0 507 072 A2 | 10/1992 |
| GB | 2 318 106 A | 4/1998 |
| JP | A-02-208136 | 8/1990 |
| JP | A-05-085228 | 4/1993 |
| JP | A-2002-036919 | 2/2002 |
| JP | A-2003-191774 | 7/2003 |
| RU | 2 104 883 C1 | 2/1998 |

OTHER PUBLICATIONS

Harata et al.; "A Simplified Serial Communication Network Within a Vehicle;" *IEEE*; May 1, 1989; pp. 437-442.

* cited by examiner

*Primary Examiner*—Gertrude Arthur Jeanglaud
(74) *Attorney, Agent, or Firm*—Oliff & Berridge, PLC

(57) ABSTRACT

An integrated control system includes subsystem with a driving system control subsystem controlling a driving system, a brake system control subsystem controlling a brake system, and a steering system control subsystem controlling a steering system, a subsystem stabilizing a current dynamic state of the vehicle, a subsystem realizing a driving support function such as automatic cruising, and a storage unit for storing shared signals. Each subsystem includes a request unit, an arbitration unit, and an output unit.

7 Claims, 16 Drawing Sheets

F I G. 7
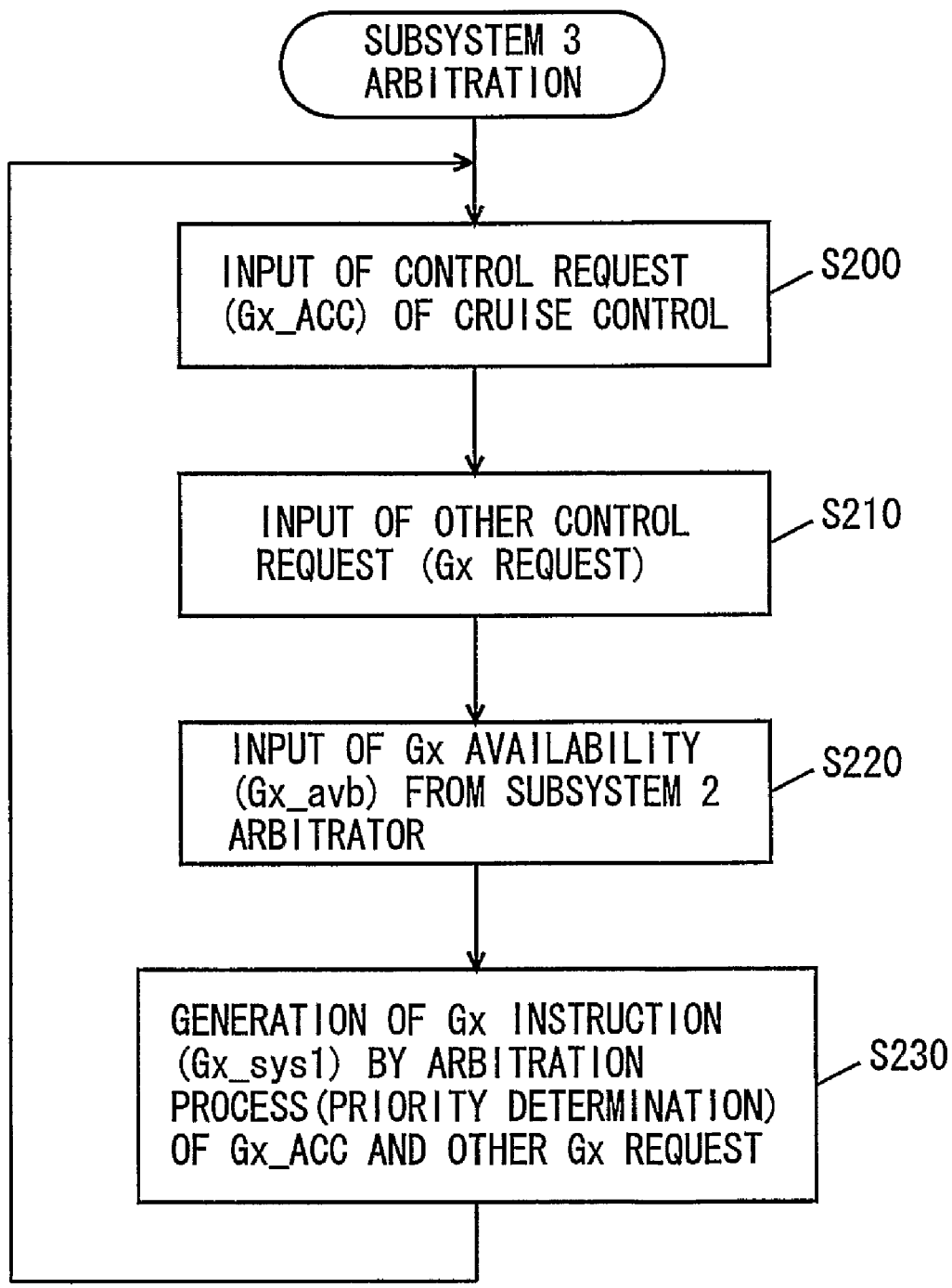

VEHICLE INTEGRATED CONTROL SYSTEM

TECHNICAL FIELD

The present invention relates to a system controlling a plurality of actuators incorporated in a vehicle, and more particularly, a system controlling in an integrated manner a plurality of actuators with the possibility of mutual interference.

BACKGROUND ART

There has been an increasing trend in recent years towards incorporating many types of motion control devices in the same vehicle to control the motion of the vehicle. The effect produced by each of the different types of motion control devices may not always emerge in a manner independent of each other at the vehicle. There is a possibility of mutual interference. It is therefore important to sufficiently organize the interaction and coordination between respective motion control devices in developing a vehicle that incorporates a plurality of types of motion control devices.

For example, when it is required to incorporate a plurality of types of motion control devices in one vehicle in the development stage of a vehicle, it is possible to develop respective motion control devices independently of each other, and then implement the interaction and coordination between respective motion control devices in a supplemental or additional manner.

In the case of developing a plurality of types of motion control devices in the aforesaid manner, organization of the interaction and coordination between respective motion control devices requires much time and effort.

With regards to the scheme of incorporating a plurality of types of motion control devices in a vehicle, there is known the scheme of sharing the same actuator among the motion control devices. This scheme involves the problem of how the contention among the plurality of motion control devices, when required to operate the same actuator at the same time, is to be resolved.

In the above-described case where the interaction and coordination among a plurality of motion control devices are to be organized in a supplemental or additional manner after the motion control devices are developed independently of each other, it is difficult to solve the problem set forth above proficiently. In practice, the problem may be accommodated only by selecting an appropriate one of the plurality of motion control devices with precedence over the others, and dedicate the actuator to the selected motion control device alone.

An approach related to the problem set forth above in a vehicle incorporating a plurality of actuators to drive a vehicle in the desired behavior is disclosed in the following publications.

Japanese Patent Laying-Open No. 5-85228 (Document 1) discloses an electronic control system of a vehicle that can reduce the time required for development, and that can improve the reliability, usability, and maintenance feasibility of the vehicle. This electronic control system for a vehicle includes elements coacting for carrying out control tasks with reference to engine power, drive power and braking operation, and elements for coordinating the coaction of the elements to effect a control of operating performance of the motor vehicle in correspondence to a request of the driver. Respective elements are arranged in the form of a plurality of hierarchical levels. At least one of the coordinating elements of the hierarchical level is adapted for acting on the element of the next hierarchical level when translating the request of the driver into a corresponding operating performance of the motor vehicle thereby acting on a pre-given subordinate system of the driver-vehicle system while providing the performance required from the hierarchical level for this subordinate system.

By organizing the entire system in a hierarchy configuration in accordance with this electronic control system for a vehicle, an instruction can be conveyed only in the direction from an upper level to a lower level. The instruction to execute the driver's request is transmitted in this direction. Accordingly, a comprehensible structure of elements independent of each other is achieved. The linkage of individual systems can be reduced to a considerable level. The independency of respective elements allows the individual elements to be developed concurrently at the same time. Therefore, each element can be developed in accordance with a predetermined object. Only a few interfaces with respect to the higher hierarchical level and a small number of interfaces for the lower hierarchical level have to be taken into account. Accordingly, optimization of the totality of the driver and the vehicle electronic control system with respect to energy consumption, environmental compatibility, safety and comfort can be achieved. As a result, a vehicle electronic control system can be provided, allowing reduction in the development time, and improvement in reliability, usability, and maintenance feasibility of a vehicle.

Japanese Patent Laying-Open No. 2003-191774 (Document 2) discloses a integrated type vehicle motion control device adapting in a hierarchy manner a software configuration for a device that controls a plurality of actuators in an integrated manner to execute motion control of a plurality of different types in a vehicle, whereby the hierarchy structure is optimized from the standpoint of practical usage. This integrated vehicle motion control device controls a plurality of actuators in an integrated manner through a computer based on information related to driving a vehicle by a driver to execute a plurality of types of vehicle motion control for the vehicle. At least the software configuration among the hardware configuration and software configuration includes a plurality of elements organized in hierarchy in a direction from the driver towards the plurality of actuators. The plurality of elements include: (a) a control unit determining the target vehicle state quantity based on the driving-related information at the higher level; and (b) an execution unit receiving the determined target vehicle state quantity as an instruction from the control unit to execute the received instruction via at least one of the plurality of actuators at the lower level. The control unit includes an upper level control unit and a lower level control unit, each issuing an instruction to control the plurality of actuators in an integrated manner. The upper level control unit determines a first target vehicle state quantity based on the driving-related information without taking into account the dynamic behavior of the vehicle, and supplies the determined first target vehicle state quantity to the lower level control unit. The lower level control unit determines the second target vehicle state quantity based on the first target vehicle state quantity received from the upper level control unit, taking into account the dynamic behavior of the vehicle, and supplies the determined second target vehicle state quantity to the execution unit. Each of the upper level control unit, the lower level control unit, and the execution unit causes the computer to execute a plurality of modules independent of each other on the software configuration to realize unique functions thereof.

In accordance with this integrated type vehicle motion control device, at least the software configuration among the hardware configuration and software configuration is organized in a hierarchy structure so as to include: (a) a control unit determining a target vehicle state quantity based on driving-related information at the higher level in the direction from the driver to the plurality of actuators; and (b) an execution unit receiving the determined target vehicle state quantity as an instruction from the control unit to execute the received instruction via at least one of the plurality of actuators at the lower level. In other words, at least the software configuration is organized in hierarchal levels such that the control unit and the execution unit are separated from each other in this vehicle motion control device. Since the control unit and the execution unit are independent of each other from the software configuration perspective, respective stages of development, designing, design modification, debugging and the like can be effected without influencing the other. Respective stages can be carried out concurrently with each other. As a result, the period of the working stage required for the entire software configuration can be readily shortened by the integrated vehicle motion control device.

The electronic control system for a vehicle disclosed in Document 1 is disadvantageous in that the entire controllability of the vehicle is degraded when in the event of system failure at the upper hierarchical level since the entire system employs a hierarchy structure.

The integrated type vehicle motion control device disclosed in Document 2 specifically discloses the hierarchy structure of Document 1, and is directed to optimization of the hierarchy structure from the standpoint of practical usage. Specifically, the software configuration is divided into at least a control unit and an execution unit, independent of each other in the hierarchy level. Although this integrated type vehicle motion control device is advantageous from the standpoint of concurrent processing of development by virtue of independency thereof, the issue of depending upon the basic concept of hierarchy is not yet resolved.

DISCLOSURE OF THE INVENTION

In view of the foregoing, an object of the present invention is to provide a vehicle integrated control system having the fail-safe faculty improved and capable of readily accommodating addition of a vehicle control function without forming a system that generates a control target of a vehicle at one site.

A vehicle integrated control system of the present invention includes at least three subsystems operating autonomously and in parallel. These subsystems include a sensing unit sensing information related to an operation request with respect to at least one subsystem, a connection unit for connection with another subsystem other than its own subsystem, and a generation unit for generating information related to an individual control target of its own subsystem based on the sensed information related to an operation request.

For example, the subsystem in accordance with the present invention includes at least a driving system control subsystem controlling a driving system device, a brake system control subsystem controlling a brake system device, and a steering system control subsystem controlling a steering system device. These subsystems operate autonomously and in parallel with respect to each other. For example, the sensing unit of the driving system control subsystem senses an accelerator pedal manipulation which is a request of a driver. The sensing unit of the brake system control unit senses a brake pedal manipulation that is a request of the driver and/or the behavior of a vehicle such as the vehicle speed, longitudinal acceleration, lateral acceleration, yaw rate, and the like. The sensing unit of the steering system control unit senses the steering manipulation that is a request of the driver. These subsystems are connected to a subsystem other than its own subsystem.

The generation unit in these subsystems generates information related to each individual control target of its own subsystem (for example, information related to the control target to control the behavior of a vehicle), based on the sensed information and information received from another subsystem. The generation unit of the driving system control subsystem generates a control target of the driving system based on information calculated in accordance with an accelerator pedal manipulation using a driving basic driver model as well as information input from another subsystem. The generation unit of the brake system control subsystem generates a control target of the brake system based on information calculated in accordance with a brake pedal manipulation using a brake basic driver model as well as information input from another subsystem. The generation unit of the steering system control subsystem generates a control target of the steering system based on information calculated in accordance with steering manipulation using a steering basic driver model as well as information input from another subsystem. At this stage, arbitration is conducted at the generation unit as to which of the plurality of information, for example, is to be given priority. Thus, the required information is transmitted using the connection unit included in the three subsystems to generate a required control target (information related to the individual control target of its own subsystem) in respective generation units. Control is allowed in a decentralized manner without setting a master unit, and the fail-safe faculty can be improved. Further, by virtue of the autonomous operation, development is allowed on the basis of each control unit and processing unit. In the case where a new driving support function is to be added, the new function (for example, a driving support system (DSS) such as cruise control and/or a vehicle motion control system (VDM: Vehicle Dynamics Management)) can be implemented by just adding a new subsystem in addition to the three subsystems set forth above and transmit the required information between the new subsystem and the already-existing subsystem through a communication unit. As a result, there can be provided a vehicle integrated control system having the fail-safe faculty improved and capable of readily accommodating addition of a vehicle control function without forming a system that generates a control target of a vehicle at one site.

Preferably, the generation unit includes an arbitration unit for arbitrating among a plurality of information to generate information related to an individual control target of its own subsystem based on the sensed information related to an operation request.

In addition to the above-described three subsystems, i.e. the driving system control subsystem, brake system control subsystem and steering system control subsystem in the present invention, a subsystem realizing a DSS is configured so as to operate autonomously and in parallel. In the case where driving request information is transmitted from the subsystem realizing a DSS to the driving system control subsystem in such a configuration, the arbitration unit of the subsystem realizing the DSS executes arbitration for determining as to whether or not the received information from the DSS that is input in addition to the driver's request is to be reflected in the motion control of the vehicle, and to what extent, if to be reflected. As a result of this arbitration, a control target of driving control is generated. Instead of information transmitted from a subsystem to another subsystem to be used at the subsystem of the receiving side for generation of a motion control target, a control target is generated after arbitration by the arbitration unit. Since the subsystems operate autonomously, development is allowed on the basis of each subsystem. Also, when a new driving support function or the like is to be added, the new function can be realized by just adding a subsystem. As a result, there can be provided a vehicle integrated control system having the fail-safe faculty improved and capable of readily accommodating addition of a vehicle control function without forming a system that generates a control target of a vehicle at one site.

A vehicle integrated control system according to another aspect of the present invention includes at least three subsystems operating autonomously and in parallel. These subsystems include a sensing unit for sensing information related to an operation request with respect to at least one subsystem, a connection unit for connection with another subsystem other than its own subsystem, and an arbitration unit for arbitrating among a plurality of information to generate information related to an individual control target of its own subsystem, based on the sensed information related to an operation request.

In accordance with the present invention, the driving system control subsystem corresponding to a "running" operation that is the basic operation of the vehicle, the brake system control subsystem corresponding to a "stop" operation, and the steering system control subsystem corresponding to a "turning" operation are configured operable in a manner autonomous and parallel to each other. Additionally, in the case where a driving support system (for example, DSS) of a high level is to be realized, a high level driving support subsystem realizing driving support of a high level is configured operable in a manner autonomous and in parallel, in addition to the driving system control subsystem, brake system control subsystem and steering system control subsystem set forth above. When driving request information is transmitted from the high level driving support subsystem to the driving system control subsystem in such a configuration, the arbitration unit of the high level driving support subsystem executes arbitration for determining as to whether information received from the high level driving support system that is input in addition to the driver's request is to be reflected in the motion control of the vehicle, and to what extent, if to be reflected. As a result of the arbitration, a control target of driving control is generated. Instead of the information transmitted from a subsystem to another subsystem to be used at the subsystem of the receiving side for generation of a target of motion control, a control target is generated after arbitration by the arbitration unit. Since the subsystem operates autonomously, development on the basis of each subsystem is allowed. Also, when a new function or the like is to be added, the new function can be realized by just adding a subsystem. In such a case, a subsystem can be readily added by connecting the subsystems with each other through a communication unit of the subsystem to transmit the required information. Even in the case where one (for example, the high level driving support subsystem) becomes inoperative, the basic operation of the vehicle can be maintained as long as the other three subsystems (driving system control subsystem, brake system control subsystem, and steering system control subsystem) are operating since the subsystems operate autonomously and parallel to each other. As a result, there can be provided a vehicle integrated control system having the fail-safe faculty improved and capable of readily accommodating addition of a vehicle control function without forming a system that generates a control target of a vehicle at one site.

Further preferably, the arbitration unit determines the priority of information.

In the case where information is received from a plurality of subsystems when a control target is to be generated at, for example, the driving system control subsystem in accordance with the present invention, the priority is determined as to which of the information related to a control target value based on a manipulation level of the accelerator pedal and the received information is to be given priority (including the case where information is further received from another subsystem). Since a control target is generated based on the determined priority, appropriate determination can be made as to which of the information required to generate a target of driving control based on the accelerator manipulation level by a driver and the information required to generate a target of driving control received from the high level driving support subsystem is to be give priority.

Further preferably, the arbitration unit corrects information.

In accordance with the present invention, for the purpose of arbitration between the sensed information (accelerator pedal opening and/or brake pedal opening) and the information received from another subsystem, the control target value can be corrected by a weighted operation, for example, to generate a control target.

Further preferably, the arbitration unit processes information.

In accordance with the present invention, information such as the degree of risk can be processed to be output to another subsystem such that the sensed information (road friction coefficient) can be used in another subsystem for arbitration. At the another subsystem receiving such information, the information can be used for generation of a control target without processing the same.

Further preferably, the subsystem includes a driving system control subsystem, a brake system control subsystem, and a steering system control subsystem.

In accordance with the present invention, the driving system control subsystem corresponding to a "running" operation that is the basic operation of the vehicle, the brake system control subsystem corresponding to a "stop" operation, and the steering system control subsystem corresponding to a "turning" operation are configured operable in a manner autonomous and parallel to each other. Additionally, in the case where a driving support system of a high level is to be realized, only an operation unit realizing a high level driving support system is to be added to these subsystems.

Further preferably, the subsystem further includes an automatic cruise subsystem controlling the vehicle for automatic cruising or pseudo automatic cruising of a vehicle.

In accordance with the present invention, an automatic cruise subsystem is added, in addition to the three basic subsystems (drive system control subsystem, brake system control subsystem and steering system control subsystem). Since the three basic subsystems as well as the automatic cruise subsystem operate autonomously and in parallel, development is allowed independently, and a function can be added readily. Such an added function facilitates modification of the contents for each type of a vehicle. The pseudo automatic cruise function includes functions in conformance with automatic cruising such as the cruise control function, lane keep assist function, and the like.

Further preferably, the subsystem further includes a dynamic stabilization subsystem controlling the vehicle for stabilization of the state of behavior of the vehicle.

In accordance with the present invention, the state of behavior of the vehicle is sensed through various sensors equipped in the vehicle. For example, the state of behavior of the vehicle includes the acceleration in the longitudinal direction or lateral direction of the vehicle. When the tendency of slippage of the vehicle is sensed by the low road friction coefficient, the dynamic stabilization subsystem generates information related a control target value to prevent slippage of the vehicle. Upon reception of this generated information at the driving system control subsystem, the arbitration unit gives priority and employs the received information instead of the level of the accelerator pedal manipulated by the driver. Therefore, a control system for stabilization of a vehicle can be readily configured as compared to the manipulation by the driver.

BRIEF DESCRIPTION OF THE DRAWINGS

FIGS. 6-7 are flow charts representing a control configuration of a program executed at a subsystem 3 of FIG. 3.

BEST MODE FOR CARRYING OUT THE INVENTION

Figure 1:
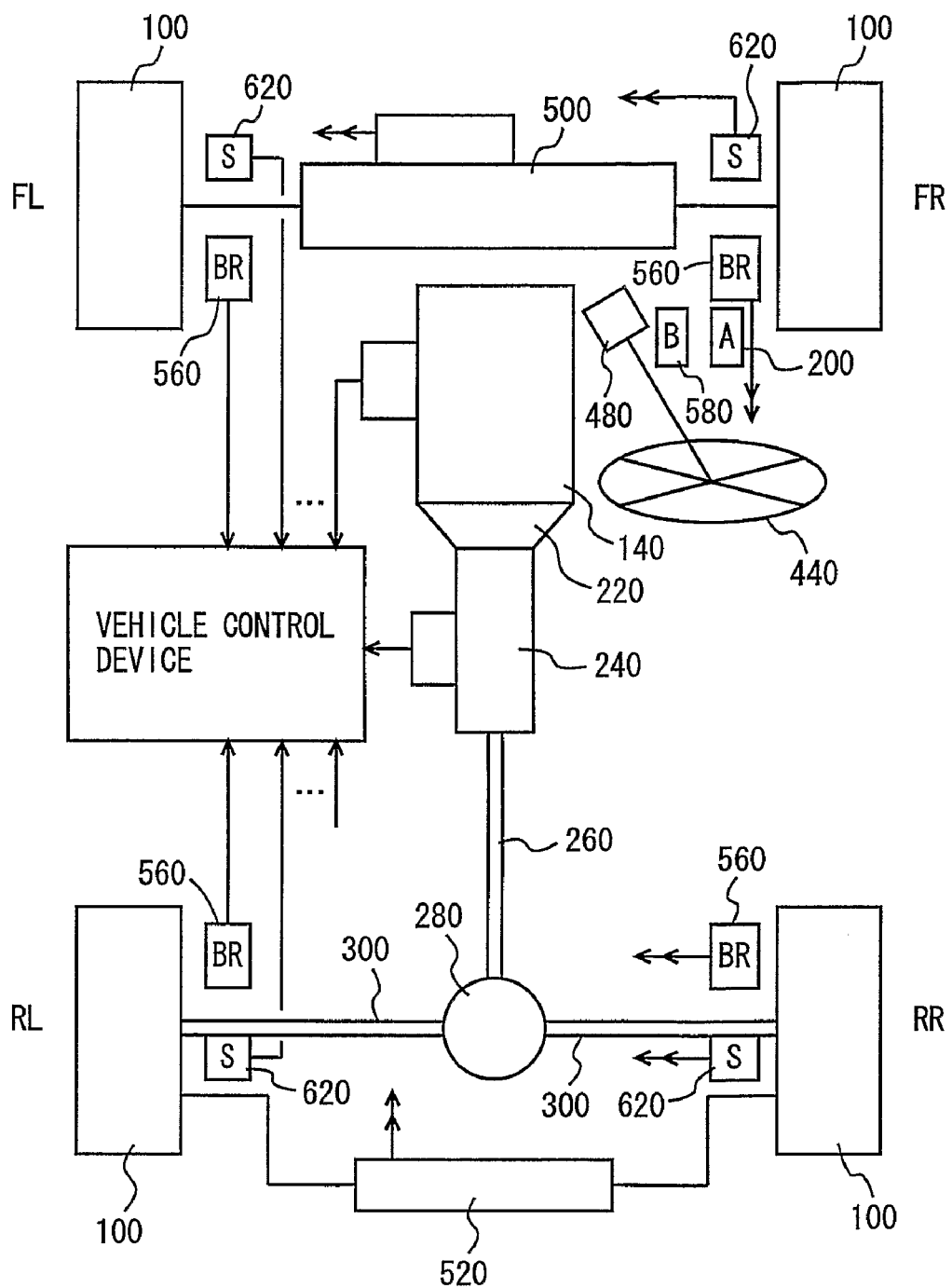
FIG. 1 is a plan view of a vehicle in which a vehicle integrated control system of the first embodiment of the present invention is incorporated.

Embodiments of the present invention will be described hereinafter with reference to the drawings. The same elements have the same reference characters allotted, and their designation and function are also identical. Therefore, detailed description thereof will not be repeated.

First Embodiment

Referring to the block diagram of FIG. 1, a vehicle integrated control system according to an embodiment of the present invention has an internal combustion engine incorporated in a vehicle as a driving power source. The driving power source is not restricted to an internal combustion engine, and may be an electric motor alone, or a combination of an engine and an electric motor. The power source of the electric motor may be a secondary battery or a cell.

The vehicle includes wheels 100 at the front and back of respective sides. In FIG. 1, "FL" denotes a front-left wheel, "FR" denotes a front-right wheel, "RL" denotes a left-rear wheel, and "RR" denotes a rear-right wheel.

The vehicle incorporates an engine 140 as a power source. The operating state of engine 140 is electrically controlled in accordance with the amount or level by which the accelerator pedal (which is one example of a member operated by the driver related to the vehicle drive) is manipulated by the driver. The operating state of engine 140 is controlled automatically, as necessary, irrespective of the manipulation of accelerator pedal 200 by the driver (hereinafter referred to as "driving operation" or "accelerating operation").

The electric control of engine 140 may be implemented by, for example, electrically controlling an opening angle (that is, a throttle opening) of a throttle valve disposed in an intake manifold of engine 140, or by electrically controlling the amount of fuel injected into the combustion chamber of engine 140.

The vehicle of the present embodiment is a rear-wheel-drive vehicle in which the right and left front wheels are driven wheels, and the right and left rear wheels are driving wheels. Engine 140 is connected to each of the rear wheels via a torque converter 220, a transmission 240, a propeller shaft 260 and a differential gear unit 280 as well as a drive shaft 300 that rotates with each rear wheel, all arranged in the order of description. Torque converter 220, transmission 240, propeller shaft 260 and differential gear 280 are power transmitting elements that are common to the right and left rear wheels.

Transmission 240 includes an automatic transmission that is not shown. This automatic transmission electrically controls the gear ratio at which the revolution speed of engine 140 is changed to the speed of rotation of an output shaft of transmission 240.

The vehicle further includes a steering wheel 440 adapted to be turned by the driver. A steering reaction force applying device 480 electrically applies a steering reaction force corresponding to a turning manipulation by the driver (hereinafter, referred to as "steering") to steering wheel 440. The level of the steering reaction force is electrically controllable.

The direction of the right and left front wheels, i.e. the front-wheel steering angle is electrically altered by a front steering device 500. Front steering device 50 controls the front-wheel steering angle based on the angle, or steering wheel angle, by which steering wheel 440 is turned by the driver. The front-rear steering angle is controlled automatically, as necessary, irrespective of the turning operation. In other words, steering wheel 440 is mechanically insulated from the right and left front wheels.

The direction of the left and right wheels, i.e., the rear-wheel steering angle is electrically altered by a rear steering device 520, likewise the front-wheel steering angle.

Each wheel 100 is provided with a brake 560 that is actuated so as to restrict each rotation. Each brake 560 is electrically controlled in accordance with the operated amount of a brake pedal 580 (which is one example of a member operated by the driver related to vehicle braking), and also controlled individually for each wheel 100 automatically.

In the present vehicle, each wheel 100 is suspended to the vehicle body (not shown) via each suspension 620. The suspending characteristics of respective suspension 620 is electrically controllable individually.

The constituent elements of the vehicle set forth above include an actuator adapted to be operated so as to electrically actuate respective elements as follows:

(1) an actuator to electrically control engine 140;

(2) an actuator to electrically control transmission 240;

(3) an actuator to electrically control steering reaction force applying device 480;

(4) an actuator to electrically control front steering device 500;

(5) an actuator to electrically control rear steering device 520;

(6) a plurality of actuators provided in association with respective brakes 560 to electrically control the braking torque applied to each wheel by a corresponding brake 560 individually;

(7) a plurality of actuators provided in association with respective suspensions 620 to electrically control the suspending characteristics of a corresponding suspension 620 individually.

As shown in FIG. 1, the vehicle integrated control system is incorporated in a vehicle having the aforesaid plurality of actuators connected. The motion control device is actuated by the electric power supplied from a battery not shown (which is an example of the vehicle power supply).

Additionally, an accelerator pedal reaction force applying device may be provided for accelerator pedal 200. In this case, an actuator to electrically control such an accelerator pedal reaction force applying device is to be provided.

Figure 2:
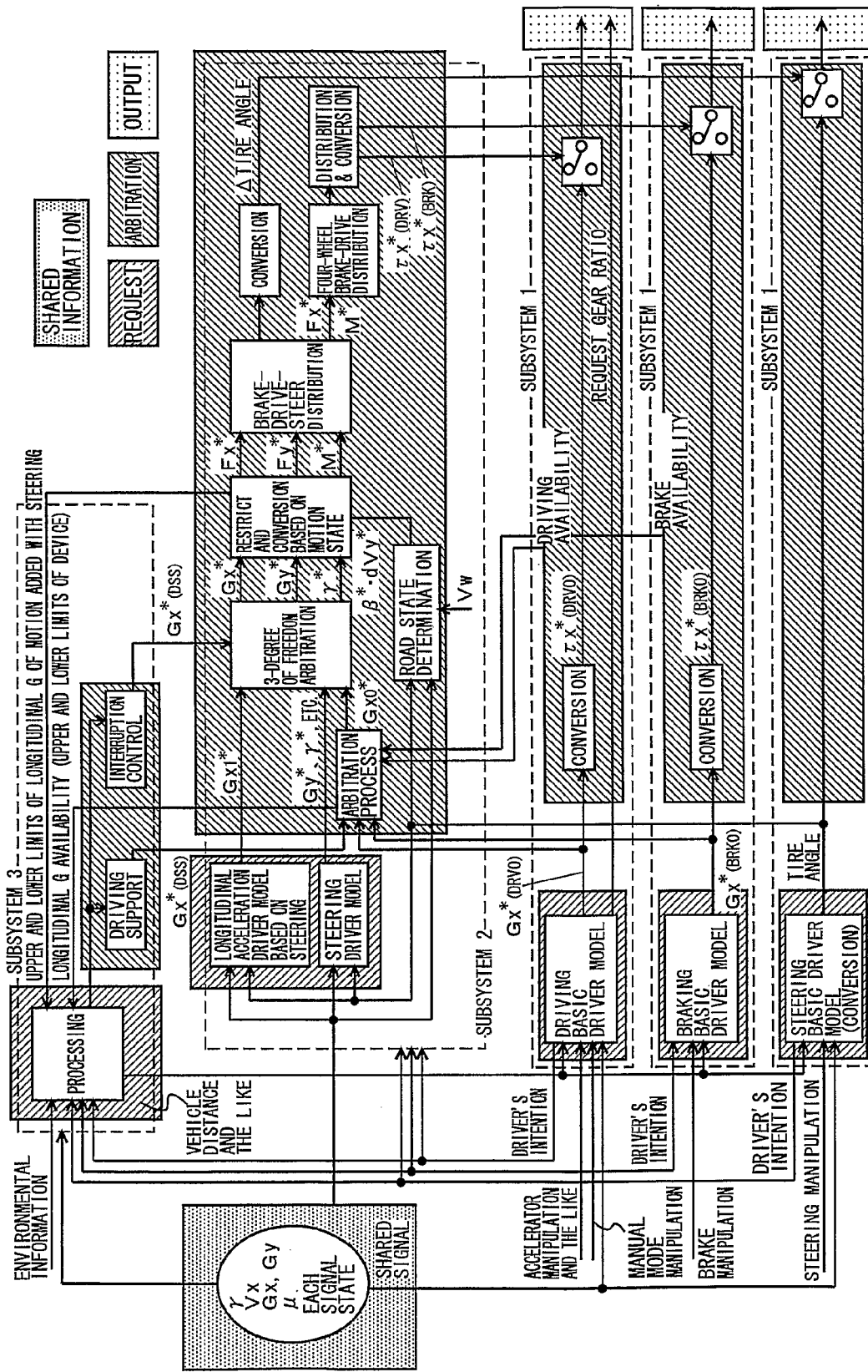
FIG. 2 is a schematic diagram of a control configuration of the vehicle integrated control system according to the first embodiment of the present invention.

FIG. 2 is a schematic diagram of a control configuration of the vehicle integrated control system according to the present embodiment. The vehicle integrated control system is formed of a subsystem 1 (basic control function) including a driving system control subsystem corresponding to a "running" operation that is the basic operation of the vehicle, a brake system control subsystem corresponding to a "stop" operation, and a steering system control subsystem corresponding to a "turning" operation, a subsystem 2 (stabilization control function of a vehicle) providing dynamic motion control and the like of a vehicle such as a VDM, and a subsystem 3 (driving support function) for a vehicle driving support such as a DSS.

In the driving system control subsystem of subsystem 1, a control target of the driving system corresponding to a driver's manipulation such as an accelerator pedal manipulation is generated using a driving basic driver model based on an accelerator pedal manipulation and/or manual mode manipulation that is the sensed driver's request, whereby an actuator is controlled.

At a request unit of the driving system control subsystem, an input signal from a sensor sensing an accelerator pedal opening and the like of the driver is analyzed using a driving basic model to calculate a target longitudinal acceleration Gx* (DRV0). At the arbitration unit of the driving system control subsystem, a target driving torque τx* (DRV0) is calculated from the target longitudinal acceleration Gx* (DRV0). At this arbitration unit, arbitration is conducted between target driving torque τx* (DRV0) and the information input from subsystem 2 (target driving torque τx* (DRV)) to select either or conduct operation based on both values, whereby a target driving torque τx* (DRV) is calculated. The actuator of engine 100 and/or the actuator of transmission 240 is controlled so as to develop this target driving torque τx* (DRV).

At the brake system control subsystem of subsystem 1, a control target of the brake system corresponding to a driver's manipulation such as a brake pedal manipulation is generated using a brake basic driver model, based on the brake pedal manipulation that is the sensed driver's request, whereby an actuator is controlled.

At the request unit of the brake system control subsystem, an input signal from a sensor sensing the brake pedal opening or the like of a driver is analyzed using a brake basic model to calculate a target longitudinal acceleration Gx* (BRK0). At the arbitration unit of the braking system control subsystem, a target driving torque τx* (BRK0) is calculated from the target longitudinal acceleration Gx* (BRK0). At this arbitration unit, arbitration is conducted between target driving torque τx* (BRK0) and the information input from subsystem 2 (target driving torque τx* (BRK)) to select either or conduct operation based on both values to calculate target driving torque τx* (BRK). The actuator of brake 560 is controlled so as to develop this target driving torque τx* (BRK).

In the steering system control subsystem of subsystem 1, a control target of the steering system corresponding to the driver's manipulation such as the steering manipulation is generated using a steering basic driver model, based on the steering manipulation that is the sensed driver's request, whereby an actuator is controlled.

At the request unit of the steering system control subsystem, an input signal from a sensor sensing a steering manipulation angle of the driver is analyzed using a steering basic model to calculate a target tire angle. At the arbitration unit of the steering system control subsystem, arbitration is conducted between the target tire angle and the information input from subsystem 2 (tire angle Δ) to select either or conduct operation based on both values to calculate a target tire angle. The actuators of steering front steering device 500 and rear steering device 520 are controlled so as to develop this target tire angle.

At subsystem 1 set forth above, information is output to subsystem 2 and subsystem 3. For example, information representing the driver's intension is output from the driving basic driver model, brake basic driver model and steering basic driver model to the request unit of subsystem 3. Additionally, target longitudinal acceleration Gx* (DRV0), target longitudinal acceleration Gx* (BRK0), and a tire angle that are respective outputs of the driving basic driver model, brake basic driver model, and steering basic driver model are provided to the arbitration unit of subsystem 2. The driving availability and brake availability are output from the arbitration unit of the driving system control subsystem and the arbitration unit of the brake system control subsystem, respectively, to the arbitration unit of subsystem 2.

Various types of information including the driver's manipulation information at subsystem 1 is stored as the shared information (also referred to as "shared signal"). The shared information includes the yaw rate γ, longitudinal direction vehicle speed Vx, longitudinal acceleration Gx, lateral acceleration Gy, road friction coefficient μ, and the like. These shared information are input to the request units of subsystems 1-3.

Subsystem 2 realizes the function to stabilize the vehicle motion state. These subsystem 2 and subsystem 3 that will be described afterwards realize the function added to the basic vehicle control function of subsystem 1 set forth above.

Subsystem 2 includes a longitudinal acceleration driver model based on steering and a steering driver model at the request unit. The shared information and tire angle input from subsystem 1 (the tire angle calculated by the steering basic driver model of the steering system control subsystem) are analyzed using the longitudinal acceleration driver model based on steering to calculate a target longitudinal acceleration Gx1*. Furthermore, the shared information and the tire angle input from subsystem 1 (the tire angle calculated by the steering basic driver model of steering system control subsystem) are analyzed using the steering driver model to calculate target lateral acceleration Gy* and target yaw rate γ*. The information calculated at the request unit of subsystem 2 is input to the arbitration unit.

The arbitration unit of subsystem 2 includes an arbitration processing unit, a 3-degree of freedom arbitration unit, a road status determination unit, a restrict and conversion unit based on the motion state, a brake-drive-steer distribution unit, a conversion unit, a four-wheel brake-drive distribution unit, and a distribution and conversion unit.

The arbitration processing unit conducts an arbitration process among target longitudinal acceleration Gx* (DSS) realizing a driving support function input from the arbitration unit of subsystem 3, target longitudinal acceleration Gx* (DRV0) calculated by the driving basic driver model of the driving system control subsystem of subsystem 1, and target longitudinal acceleration Gx* (BRK0) calculated by the brake basic driver model of the brake system control subsystem of subsystem 1. At this stage, the driving availability input from the arbitration unit of the driving system control subsystem of subsystem 1 and the brake availability input from the arbitration unit of the brake system control subsystem of subsystem 1 are used. As a result of the arbitration at the arbitration processing unit, target longitudinal acceleration Gx0* is provided to the 3-degree of freedom arbitration unit. Further, the longitudinal G availability is output to the request unit of subsystem 3.

The 3-degree of freedom arbitration unit conducts an arbitration process among target longitudinal acceleration Gx1* from the request unit, target lateral acceleration Gy* and target yaw rate γ*, target longitudinal acceleration Gx0* from the arbitration processing unit, and target longitudinal acceleration Gx* (DSS) from the arbitration unit of subsystem 3. As a result of the arbitration process by the 3-degree of freedom arbitration unit, target longitudinal acceleration Gx*, target lateral acceleration Gy*, target yaw rate γ*, target body slip angle β*, and differential target value dVy* of the body lateral speed are output to the restrict and conversion unit based on the motion state.

The road friction resistance coefficient (μ value) that is one of the shared information, wheel speed Vw, and the tire angle output from the steering basic driver model of the steering system control subsystem of subsystem 1 are applied to the road status determination unit. Operation is executed based on these input values at the road state determination unit to provide the μ value that is the road resistance value to the restrict and conversion unit based on the motion state.

At the restrict and conversion unit based on the motion state, operation is executed based on target longitudinal acceleration Gx*, target lateral acceleration Gy*, target yaw rate γ*, target body slip angle β*, and differential target value dVy* of the body lateral speed output from the 3-degree of freedom arbitration unit, as well as the μ value input from the road state determination unit to provide Fx* that is the force in the target longitudinal direction, Fy* that is the force in the target lateral direction, and target moment M* about the z axis to the brake-drive-steer distribution unit. The upper and lower limits of longitudinal value G of the motion added with steering are output as the availability from the restrict and conversion unit based on the motion state to subsystem 3.

The brake-drive-steer distribution unit executes the distribution process among the brake system, driving system and steering system based on Fx* that is the force in the target longitudinal direction, Fy* that is the force in the target lateral direction, and target moment M* about the z axis output from the restrict and conversion unit based on the motion state to provide tire angle Δ to the conversion unit and to provide target longitudinal force Fx* and target moment M* about the z axis to the four-wheel brake-drive distribution unit. The four-wheel brake-drive distribution unit executes an operation based on target longitudinal force Fx* and target moment M* about the z axis applied from the brake-drive-steer distribution unit to provide the operation result to the distribution and conversion unit.

Tire angle Δ output from the conversion unit of subsystem 2 is provided to the arbitration unit of subsystem 1. The target driving torque τx* (DRV) output from the distribution and conversion unit of subsystem 2 is applied to the arbitration unit of the driving system control subsystem of subsystem 1. The target driving torque τx* (BRK) output from the distribution and conversion unit of subsystem 2 is applied to the arbitration unit of the brake system subsystem of subsystem 1.

At subsystem 3, the shared information and environmental information are applied to the request unit. Furthermore, information representing the driver's intention is input from the driving basic driver model, brake basic driver model, and steering basic driver model of subsystem 1. Following the process executed at the request unit, information to realize adaptive cruise control, for example, is applied to the arbitration unit based on the distance between vehicles and the like. The request unit of subsystem 3 receives longitudinal G availability applied from the arbitration unit of subsystem 2 and also the upper and lower limits (availability) of the longitudinal G of the motion added with the steering from the restrict and conversion unit based on the motion state of subsystem 2.

In accordance with the information output from the request unit of subsystem 3, the arbitration unit of subsystem 3 executes an operation through the drive support unit and interruption control unit. At the drive support unit, target longitudinal acceleration Gx* (DSS) is output to the arbitration unit of subsystem 2. Furthermore, target longitudinal acceleration Gx* (DSS) is output from the interruption control unit to the 3-degree of freedom arbitration unit of subsystem 2. The present subsystem 3 includes the adaptive cruise controller and the like to realize pseudo automatic cruising. This adaptive cruise controller is adapted to maintain a predetermined distance from the vehicle running ahead as well as to maintain the currently-running lane.

Figure 3:
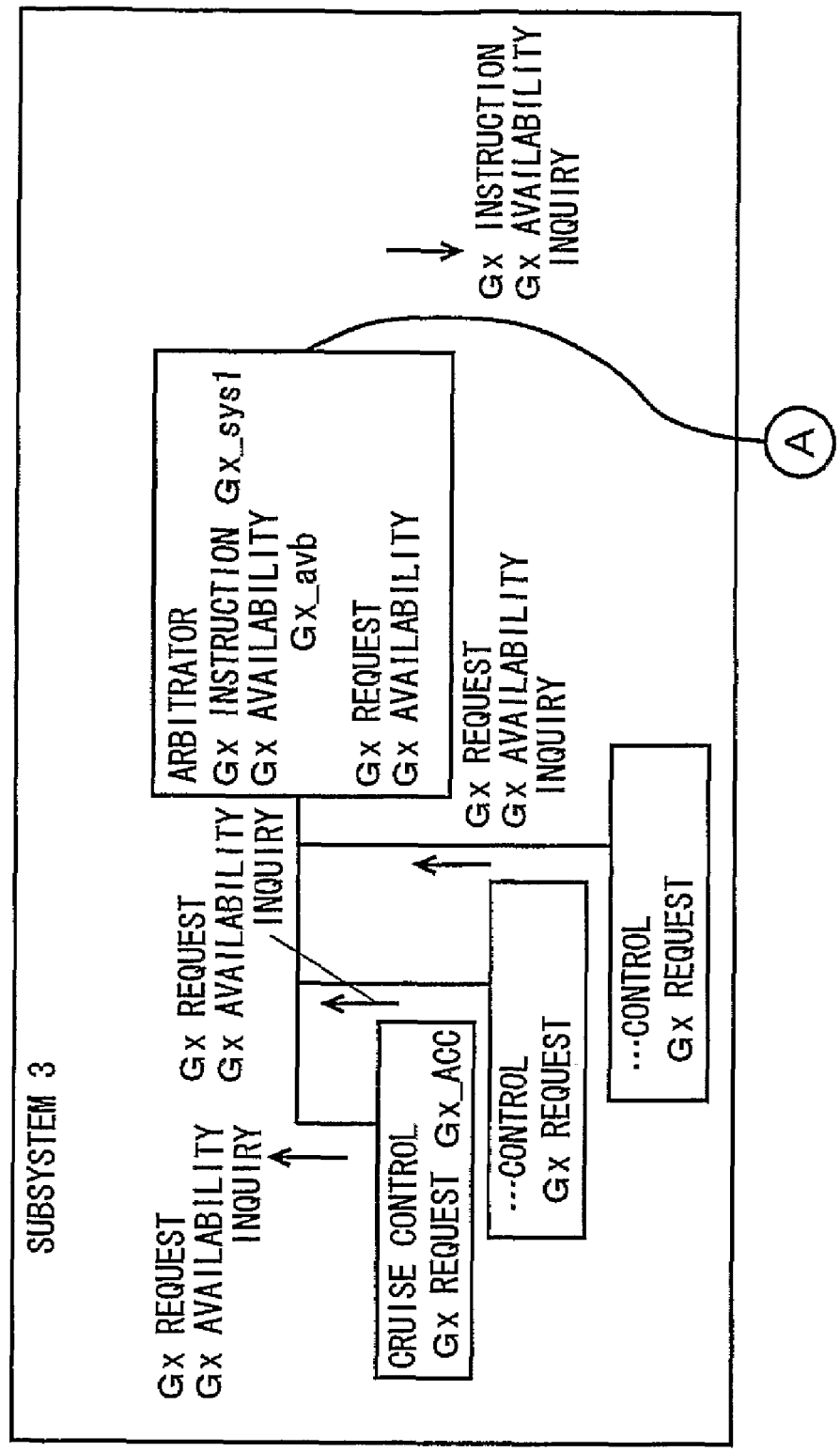
FIGS. 3-5 represent an implementation configuration of the vehicle integrated control system of the first embodiment of the present invention (first diagram).
Figure 4:
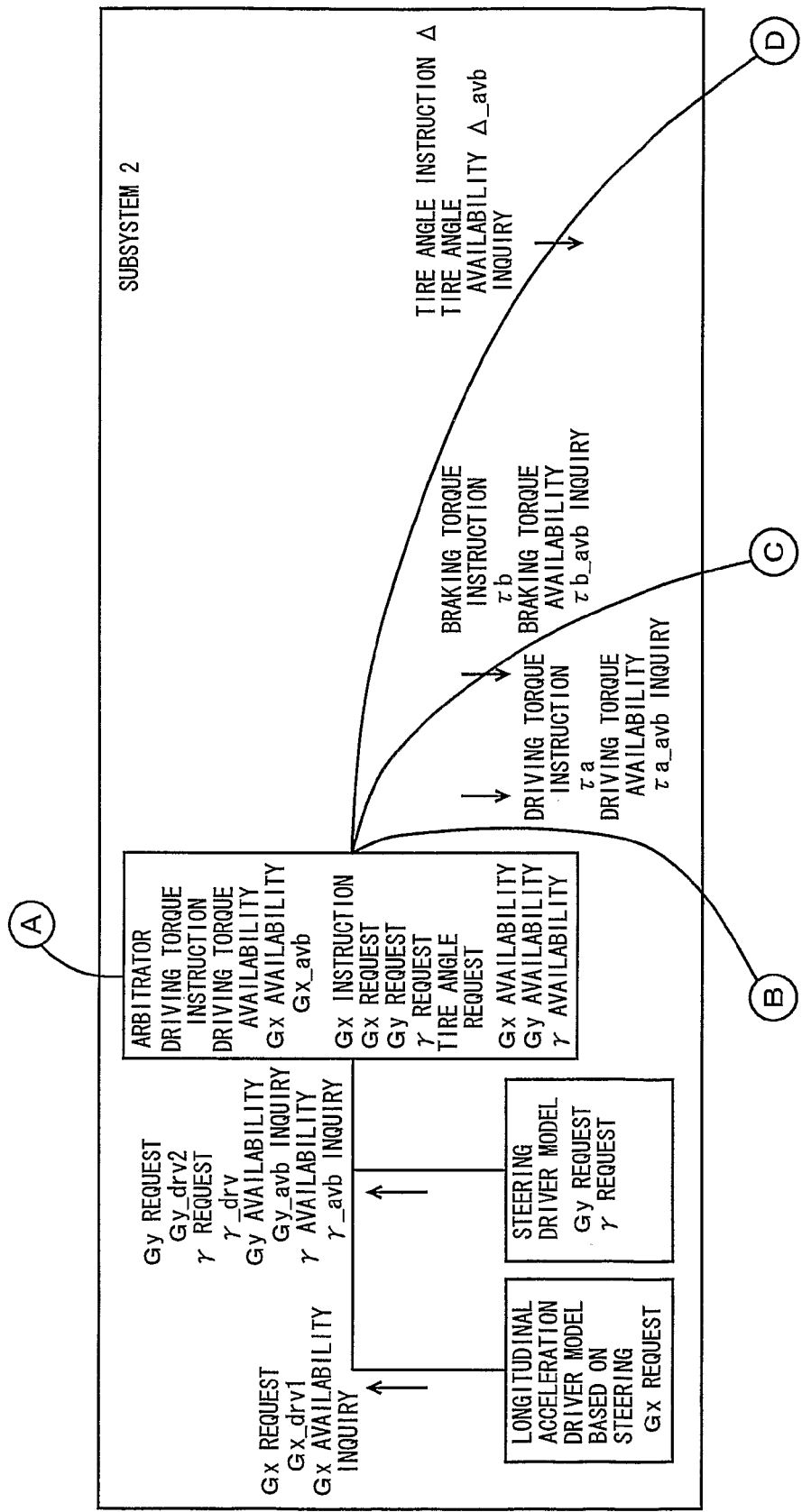
Figure 5:
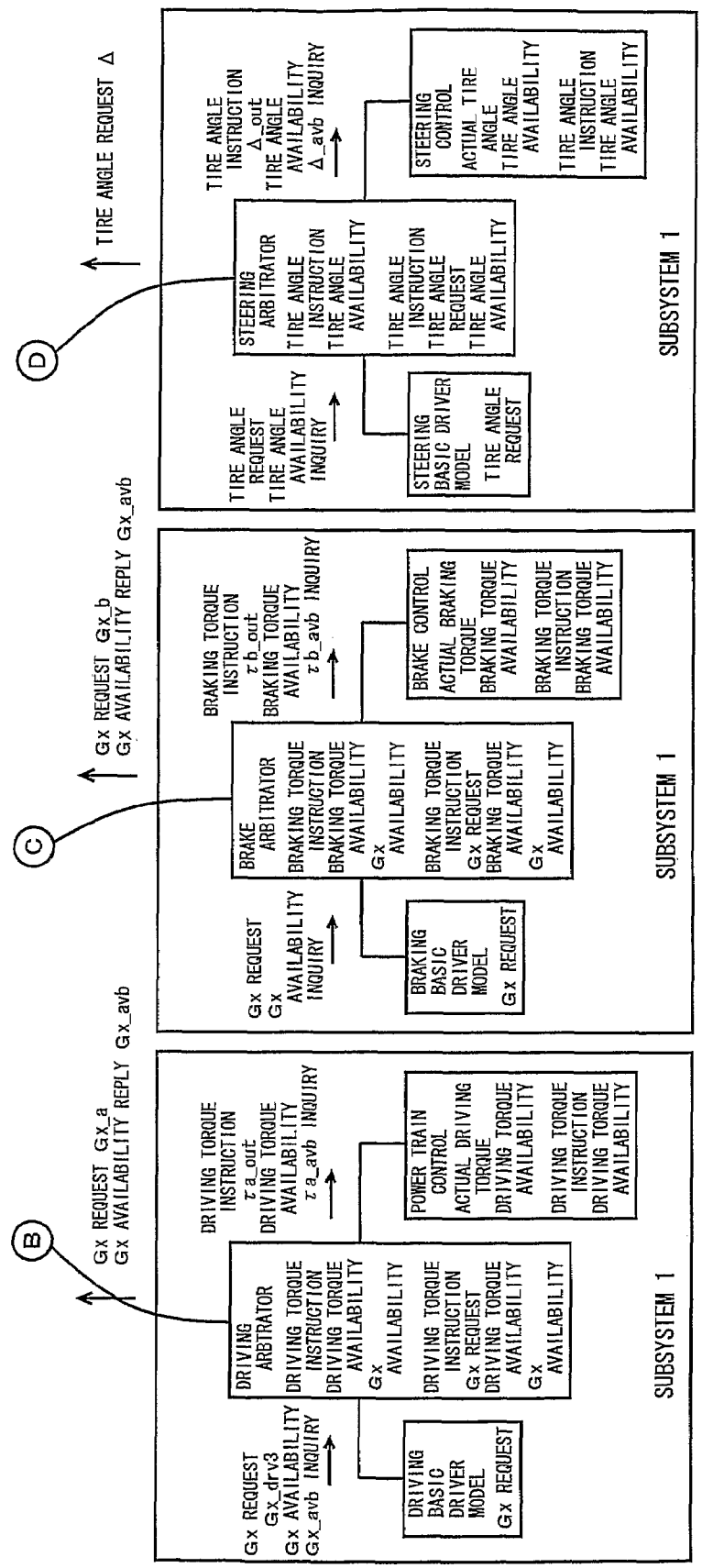

FIGS. 3-5 represent the implementation configuration of the vehicle integrated control system of FIG. 2. Specifically, FIGS. 3, 4 and 5 represent the implementation configuration of subsystem 3, subsystem 2, and subsystem 1, respectively.

As shown in FIG. 3, subsystem 3 is implemented to realize the control configuration shown in FIG. 2. The arbitrator of subsystem 3 receives a Gx request and/or Gx availability inquiry from the controller that executes control of the driving system such as the cruise control controller.

At the arbitrator of FIG. 3, the Gx instruction and Gx availability inquiry that are to be output to subsystem 2 are calculated based on an input Gx instruction (Gx_sys1) and Gx availability (Gx_avb).

As shown in FIG. 4, the arbitrator of subsystem 2 receives Gx request (Gx_drv1) from the driving driver model based on steering as well as Gx availability inquiry. The arbitrator of subsystem 2 also receives Gy request (Gy_drv2) from the steering driver model, γ request (γ_drv), Gy availability (Gy_avb) inquiry, and γ availability (γ_avb) inquiry.

At the arbitrator of subsystem 2, operation is executed based on the Gx instruction and Gx availability (Gx_avb) inquiry input from subsystem 3, and also the Gx request, Gy request, γ request, tire angle request as well as Gx availability inquiry, Gy availability inquiry, and γ availability inquiry input within subsystem 2 to calculate a instruction value that is to be output to the driving arbitrator that is the arbitrator of the driving system of subsystem 1, to the brake arbitrator that is the arbitrator of the brake system, and to the steering arbitrator that is the arbitrator of the steering system.

At this stage, a driving torque instruction (τa) and driving torque availability (τa_avb) inquiry are output from the arbitrator of subsystem 2 to the driving arbitrator of subsystem 1. The braking torque instruction (τb) and braking torque availability (τb_avb) inquiry are output from the arbitrator of subsystem 2 to the brake arbitrator of subsystem 1. The tire angle instruction Δ and tire angle availability (Δ_avb) inquiry are output from the arbitrator of subsystem 2 to the steering arbitrator of subsystem 1.

As shown in FIG. 5, subsystem 1 includes the subsystem of the drive control system, the subsystem of the brake control system, and the subsystem of the steering control system, as set forth above. Respective subsystems employ a configuration including a driving arbitrator, brake arbitrator, and steering arbitrator.

The driving arbitrator of FIG. 5 receives Gx request (Gx_drv3) and Gx availability (Gx_avb) inquiry from the driving basic driver model as well as Gx request (Gx_a) and Gx availability (Gx_avb) inquiry from the arbitrator of subsystem 2. The driving arbitrator arbitrates a target value related to driving based on the driver's request applied from the basic driving driver model and information other than the driver's manipulation request applied from the arbitrator of subsystem 2 to provide driving torque instruction (τa_out) and driving torque availability (τa_avb) inquiry to the power train controller.

At the power train controller, the power train (engine 100 and transmission 240) is controlled such that the actual driving torque is equal to the driving torque instruction (τa_out). Furthermore, Gx request (Gx_a) and Gx availability (Gx_avb) reply are output from the driving arbitrator to the arbitrator of subsystem 2.

The brake arbitrator of the brake control system subsystem of subsystem 1 receives the Gx request and Gx availability inquiry from the brake basic driver model. Furthermore, braking torque instruction (τb) and braking torque availability (τb_avb) inquiry are output from the arbitrator of subsystem 2 to the brake arbitrator. The brake arbitrator conducts arbitration based on the input information in accordance with the driver's manipulation and information other than the driver's manipulation to output the braking torque instruction (τb_out) and braking torque availability (τb_avb) inquiry to the brake controller. The brake controller controls the actual braking torque so as to realize the braking torque instruction (τb_out) output from the brake arbitrator. At this stage, the wheel brake is controlled. Furthermore, control is provided so as to increase the regenerative power generation by a motor generator and the like at the hybrid vehicle. Additionally, Gx request (Gx_b) and Gx availability (Gx_avb) reply are output from the brake arbitrator to the arbitrator of subsystem 2.

The tire angle request and tire angle availability inquiry are output from the steering basic driver model to the steering arbitrator of the steering system subsystem of subsystem 1. Furthermore, the tire angle instruction (Δ) and tire angle availability (Δ_avb) inquiry are output from the arbitrator of subsystem 2 to the steering arbitrator. The steering arbitrator conducts arbitration among the input information to provide tire angle instruction (Δ_out) and tire angle availability (Δ_avb) inquiry to the steering controller. The steering controller controls the actual tire angle so as to realize the input tire angle instruction (Δ_out). Furthermore, tire angle request Δ is output from the steering arbitrator to the arbitrator of subsystem 2.

The control configuration of the vehicle integrated control system set forth above and the control configuration of the program executed at respective subsystems with the implementation configuration thereof will be described hereinafter with reference to flow charts.

Figure 6:
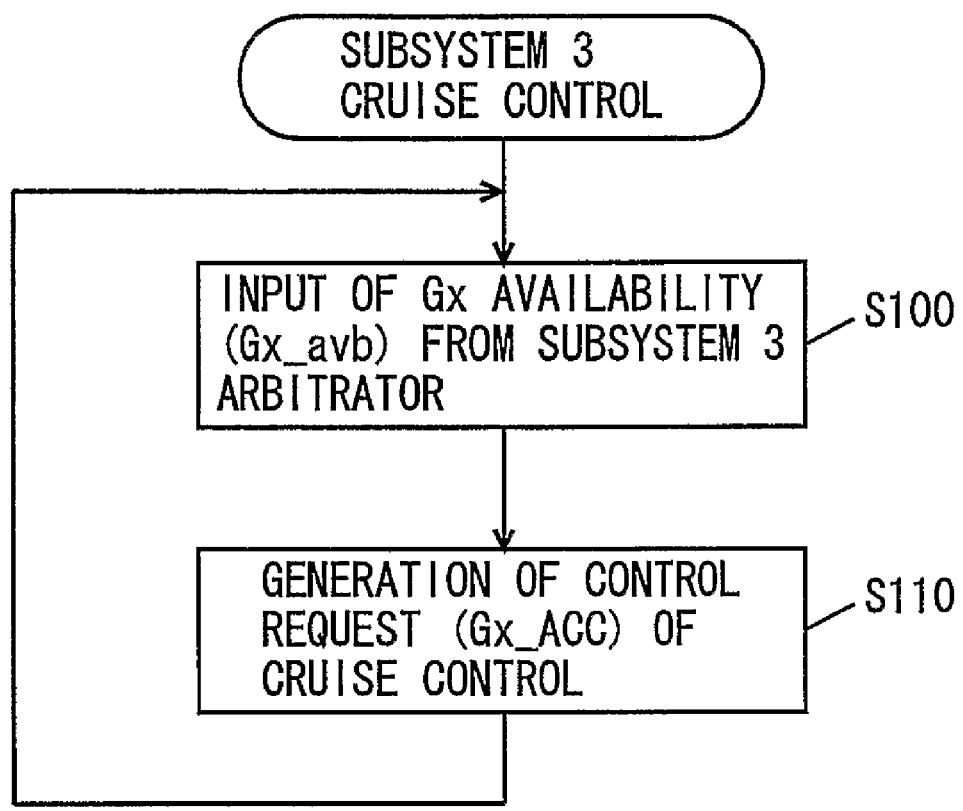

FIG. 6 corresponds to a control configuration of a program realizing the cruise control controller of subsystem 3.

At step (step abbreviated as S hereinafter) 100, Gx availability (Gx_avb) is input from the arbitrator of subsystem 3 to the cruise control controller of subsystem 3. At S110, the cruise control controller generates control request (Gx_ACC) of cruise control based on the input Gx availability (Gx_avb), environmental information, shared information, and the like. The generated control request (Gx_ACC) of cruise control is applied to the arbitrator of subsystem 3.

FIG. 7 corresponds to a control configuration of a program executed at the arbitrator of subsystem 3.

At S200, control request (Gx_ACC) of cruise control is output from the cruise control controller to the arbitrator of subsystem 3. At S210, another control request (Gx request) is applied to the arbitrator of subsystem 3. At this stage, control request and the like from an advance collision obviation control system are input.

At S220, the arbitrator of subsystem 3 receives Gx availability (Gx_avb) from the arbitrator of subsystem 2. At S230, the arbitrator of subsystem 3 generates Gx instruction (Gx_sys1) through the arbitration process of control request (Gx_ACC) of cruise control and other control requests (Gx request). At this stage, an arbitration process is executed by determining priority of the Gx request from the collision obviation system.

Figure 8:
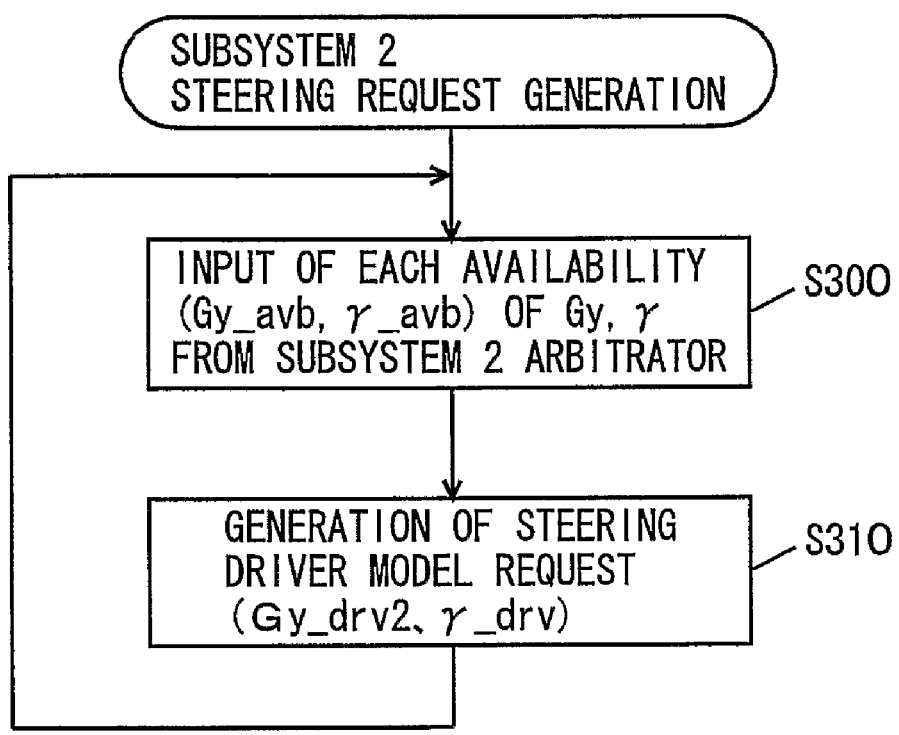
FIGS. 8-9 are flow charts representing a control configuration of a program executed by a subsystem 2 of FIG. 4.

The steering request generation process of subsystem 2 will be described with reference to FIG. 8.

At S300, the vehicle lateral acceleration Gy and each availability of yaw rate γ (Gy_avb, γ_avb) are output from the arbitrator of subsystem 2 to the steering driver model of subsystem 2. At S310, the steering driver model generates a steering driver model request (Gy_drv2, γ_drv) using a driver model. The generated steering driver model request (Gy_drv2, γ_drv) is provided to the arbitrator. The steering request generation at the steering driver model of FIG. 8 is conducted by a program similar to that of the longitudinal acceleration driver model based on steering. Therefore, detailed description thereof will not be repeated.

Figure 9:
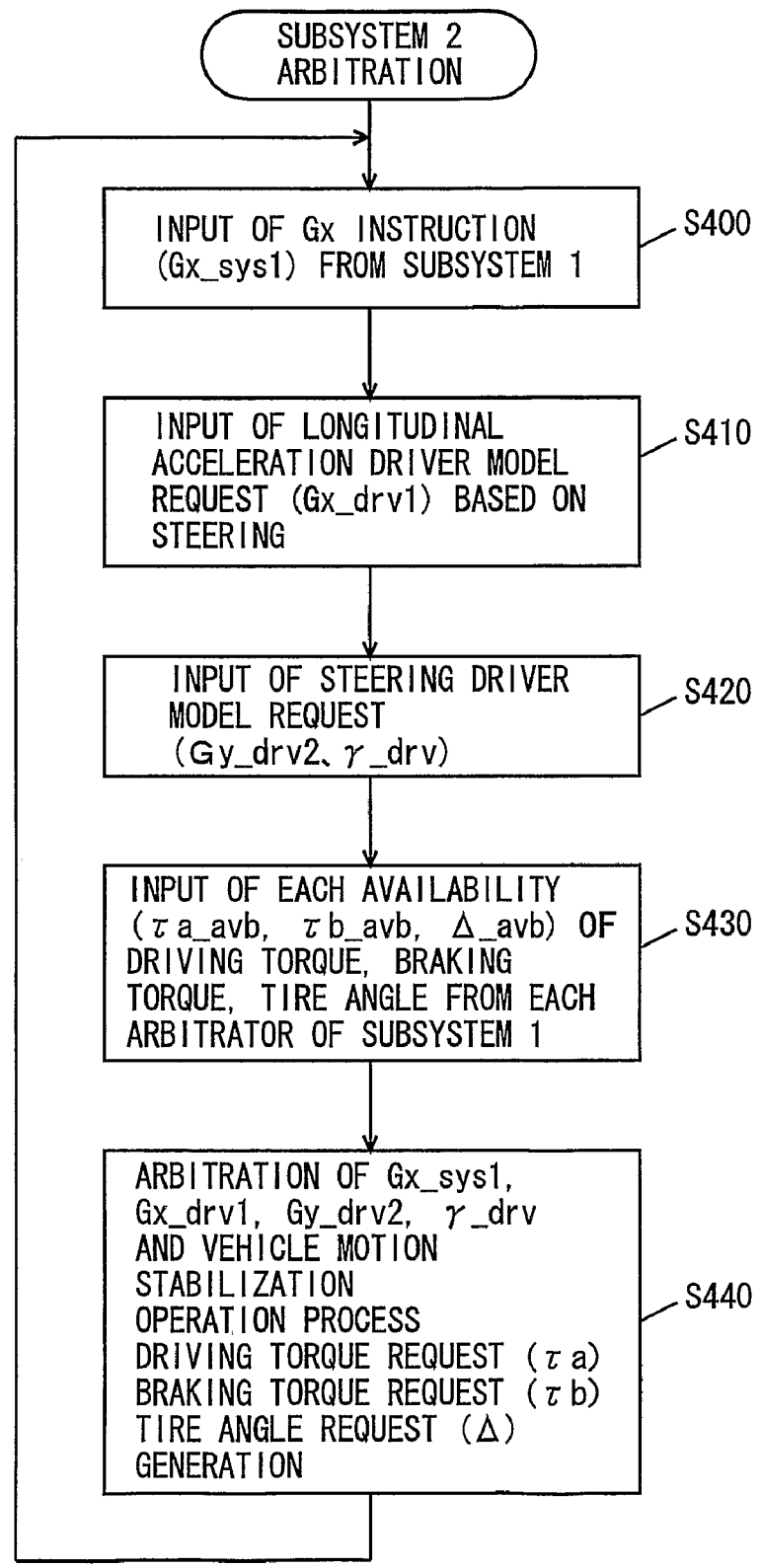

FIG. 9 corresponds to a control configuration of a program executed at the arbitrator of subsystem 2.

At S400, Gx instruction (Gx_sys1) is output from subsystem 1 to the arbitrator of subsystem 2. At S410, longitudinal acceleration driver model request (Gx_drv1) based on steering is applied to the arbitrator of subsystem 2. At S420, steering driver model request (Gy_drv2, γ_drv) is output from the steering driver model to the arbitrator of subsystem 2.

At S430, the driving torque, braking torque, and each availability of the tire angle (τa_avb, τb_avb, Δ_avb) are output from respective arbitrators of subsystem 1 to the arbitrator of subsystem 2.

At S440, the arbitrator of subsystem 2 executes the arbitration process among Gx instruction (Gx_sys1), longitudinal acceleration driver model request (Gx_drv1), and steering driver model request (Gy_drv2, γ_drv), and a vehicle motion stabilization operation process. By these arbitration process and vehicle motion stabilization operation process, driving torque request (τa), braking torque request (τb), and tire angle request (Δ) are generated. The generated driving torque request (τa) is output to the driving arbitrator of subsystem 1. The generated braking torque request (τb) is output to the brake arbitrator of subsystem 1. The generated tire angle request (Δ) is output to the steering arbitrator of subsystem 1.

Figure 10:
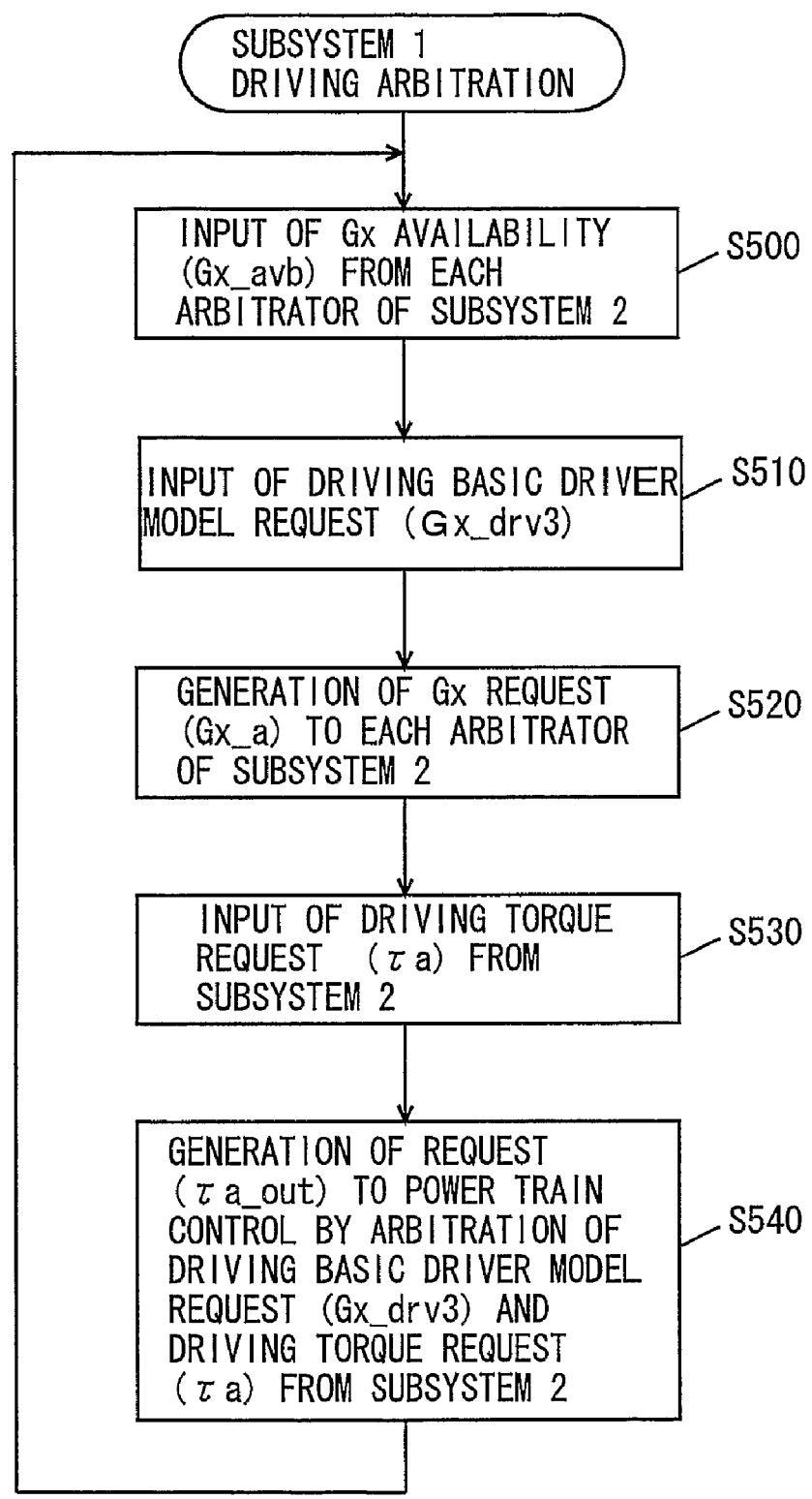
FIGS. 10-12 are flow charts representing a control configuration of a program executed at a subsystem 1 of FIG. 5.

FIG. 10 corresponds to a control configuration of a program executed at the driving arbitrator of subsystem 1.

At S500, Gx availability (Gx_avb) is output from respective arbitrators of subsystem 2 to the driving arbitrator of subsystem 1. At S510, a driving basic driver model request (Gx_drv3) is applied to the driving arbitrator of subsystem 1. This is output from the driving basic driver model of the driving control system subsystem of subsystem 1 to the driving arbitrator.

At S520, the driving arbitrator of subsystem 1 generates a Gx request (Gx_a) to be output to respective arbitrators of subsystem 2.

At S530, driving torque request (τa) is output from subsystem 2 to the driving arbitrator of subsystem 1. At S540, the driving arbitrator of subsystem 1 generates a request to the power train (τa_out) through the arbitration process between driving basic driver model request (Gx_drv3) and driving torque request (τa) from subsystem 2. The generated request (τa_out) is provided to the power train controller.

Figure 11:
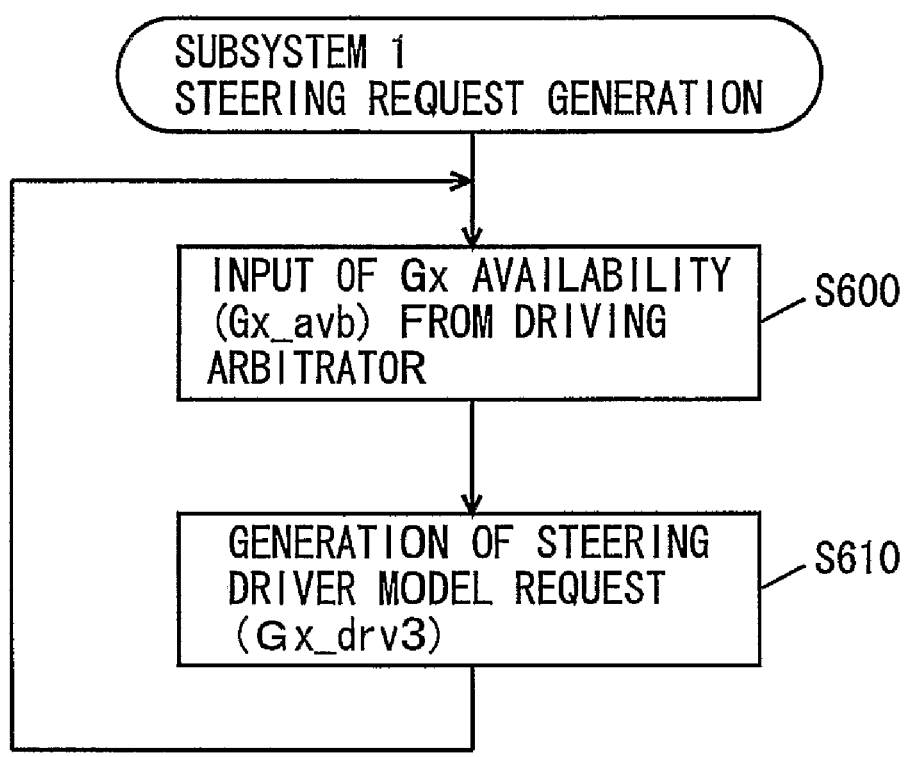

FIG. 11 corresponds to a control configuration of the steering request generation process executed at the driving basic driver model of subsystem 1.

At S600, Gx availability (Gx_avb) is output from the driving arbitrator to the driving basic driver model. At S610, the driving basic driver model generates a steering driver model request (Gx_drv3) using the input Gx availability (Gx_avb). The generated steering driver model request (Gx_drv3) is output to the driving arbitrator.

Figure 12:
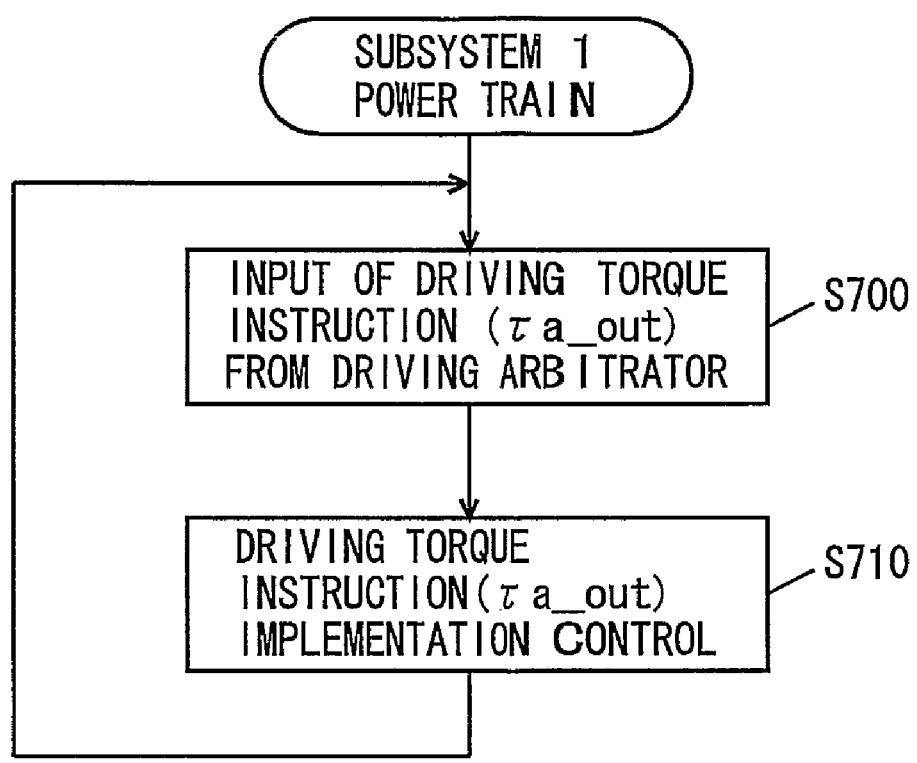

FIG. 12 corresponds to a control configuration of a program executed at the power train controller of subsystem 1.

At S700, the driving torque instruction (τa_out) is output from the driving arbitrator to the power train controller.

At S710, the driving arbitrator executes control to realize a driving torque instruction (τa_out). At this stage, the power train controller controls engine 140 and transmission 140 such that driving torque instruction (τa_out) is realized. The vehicle integrated control system of the present embodiment includes a request unit, an arbitration unit, and an output unit as the elements constituting the subsystem. Furthermore, various information of the vehicle are stored as shared information. The request unit calculates each control request based on the shared information. The arbitration unit conducts arbitration among the requests from a plurality of request units and the request from another subsystem to integrate the requests eventually as one request. The output unit is adapted to provide an output to another subsystem based on the request from the arbitration unit. Information available at respective request units, shared by the entire control system, is stored as the shared information. The functional unit including a request unit, an arbitration unit and an output unit is presented as subsystems 1-3 (subsystem 1 further includes 3 subsystems, i.e. a driving system control subsystem, brake system control subsystem, and a steering system control subsystem). The entire functionality is realized by a combination of the subsystem. Each subsystem operates autonomously, allowing operation of its own subsystem by communication of information among the arbitration units.

By virtue of such a configuration, addition of a function of a high level such as an automatic cruising function, when required, can be realized by just adding a subsystem with such a function (without having to modify the existing subsystem). Specifically, when a subsystem 3 to realize a cruise control system is to be added in addition to subsystems 1 and 2, subsystem 3 can be realized by just a simple addition without modifying the system configuration of subsystem 1 and subsystem 2. In other words, the function can be improved in an incremental manner.

In the aforementioned case, the region to be modified in the existing subsystems 1 and 2 may be only the arbitration unit. By virtue of the subsystem operating autonomously and in a decentralized manner, the failure of one subsystem will not cause failure of all the functions. For example, even if the function of subsystem 3 and/or subsystem 2 is disabled by failure or the like, the vehicle can run stably as long as subsystem 1 operates properly.

Furthermore, the vehicle integrated control system of the present embodiment formed of subsystems that operate autonomously and in a decentralized manner has favorable affinity to decentralize control technology. The decentralized control technology refers to the approach to realize a function without being restricted to the physical arrangement of the function. In the vehicle integrated control system of the present embodiment, the functional arrangement configuration (function architecture) can be modified arbitrarily beyond the mounted ECU by virtue of the high independency in the request, arbitration and output, as well as the high independency between the subsystems. It is no longer necessary to regard the architecture as being settled from the beginning, and the architecture can be modified arbitrarily even after the hardware configuration has been determined. For example, by connecting the request unit of an ECU to the arbitration unit of another ECU and further connecting to the output unit of still another ECU, a subsystem exceeding the ECUs can be developed.

Information is communicated appropriately between the arbitrators of respective subsystems. It is preferable to process the information so as to be used common to respective subsystems. Accordingly, it will not be necessary for each arbitrator of respective subsystems to process the information for its own arbitration.

Second Embodiment

A vehicle integrated control system according to a second embodiment of the present invention will be described hereinafter with reference to FIG. 13 corresponding to a control configuration. This FIG. 13 corresponds to FIG. 2.

Figure 13:
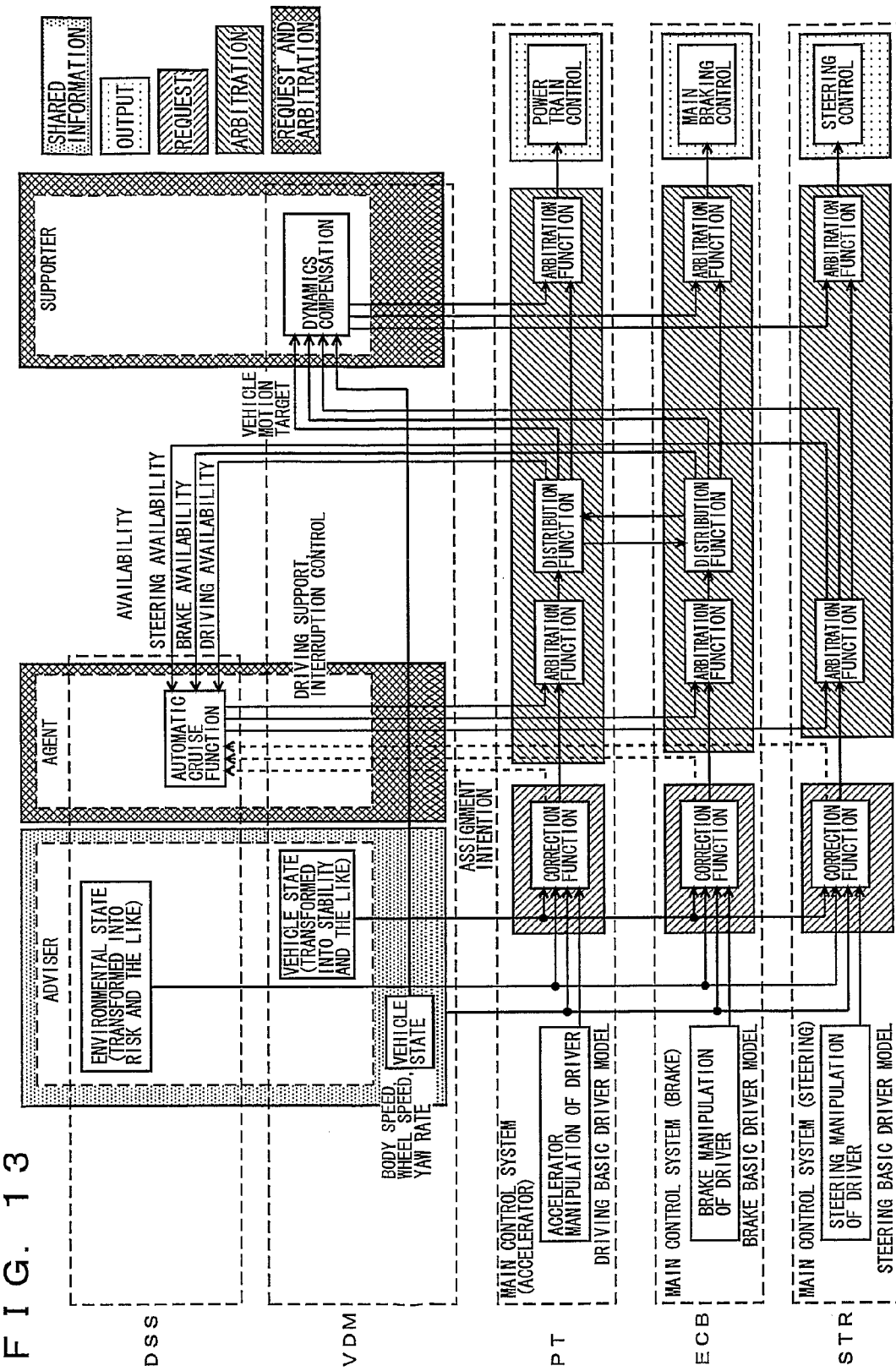
FIG. 13 is a schematic diagram representing a control configuration of a vehicle integrated control system according to a second embodiment of the present invention.

As shown in FIG. 13, the vehicle integrated control system of the second embodiment is formed of three basic control units, i.e. a main control system (1) as the driving system control unit, a main control system (2) as the brake system control unit, and a main control system (3) as the steering system control unit.

At main control system (1) identified as the driving system control unit, a control target of the driving system corresponding to accelerator pedal manipulation is generated using the driving basic driver model, based on the accelerator pedal manipulation that is the sensed request of the driver, whereby the actuator is controlled. At main control system (1), the input signal from the sensor to sense the accelerator pedal opening of the driver is analyzed using the drive basic model to calculate a target longitudinal acceleration Gx* (DRV0). The target longitudinal acceleration Gx* (DRV0) is corrected by a correction functional block based on the information from an adviser unit. Further, target longitudinal acceleration Gx* (DRV0) is arbitrated by the arbitration functional block based on the information from an agent unit. Further, the driving torque and braking torque are distributed with main control system (2), and the target driving torque τx* (DRV0) of the driving side is calculated. Further, the target driving torque τx* (DRV0) is arbitrated by the arbitration functional block based on information from a supporter unit, and a target driving torque τx* (DRV) is calculated. The actuator of engine 100 is controlled so as to develop this target driving torque τx* (DRV).

At main control system (2) identified as the brake system control unit, a control target of the brake system corresponding to the brake pedal manipulation is generated using the brake basic driver model based on the brake pedal manipulation that is the sensed request of the driver, whereby the actuator is controlled.

At main control system (2), the input signal from a sensor to sense the brake pedal opening of the driver is analyzed using a brake basic model to calculate a target longitudinal acceleration Gx* (BRK0). At main control system (2), the target longitudinal acceleration Gx* (BRK0) is corrected by a correction functional block based on the information from the adviser unit. Further at main control system (2), the target longitudinal acceleration Gx* (BRK0) is arbitrated by the arbitration functional block based on the information from the agent unit. Further at main control system (2), the driving torque and the braking torque are distributed with main control system (1), and the target braking torque τx* (BRK0) of the braking side is calculated. Further, the target braking torque τx* (BRK0) is arbitrated by the arbitration functional block based on the information from the support unit, and target braking torque τx* (BRK) is calculated. The actuator of brake 560 is controlled so as to develop this target braking torque τx* (BRK).

At main control system (3) identified as the steering system control unit, a control target of the steering system corresponding to the steering manipulation is generated using the steering brake basic driver model based on the steering manipulation that is the sensed request of the driver, whereby the actuator is controlled.

At main control system (3), an input signal from the sensor to sense the steering angle of the driver is analyzed using a steering basic model to calculate a target tire angle. The target tire angle is corrected by the correction functional block based on the information from the adviser unit. Further, the target tire angle is arbitrated by the arbitration functional block based on the information from the agent unit. Further, the target tire angle is arbitrated by the arbitration functional block based on the information from the supporter unit, whereby the target tire angle is calculated. The actuators of front steering device 500 and rear steering device 520 are controlled so as to develop the target tire angle.

Furthermore, the present vehicle integrated control system includes three processing units parallel to main control system (1) (driving system control unit), main control system (2) (brake system unit) and main control system (3) (steering system control unit), operating autonomously. The first processing unit is an adviser unit with an adviser function. The second processing unit is an agent unit with an agent function. The third processing unit is a support unit with a supporter function.

The adviser unit generates and provides to respective main control systems information to be used at respective main control systems based on the environmental information around the vehicle or information related to the driver. The agent unit generates and provides to respective main control systems information to be used at respective main control systems to cause the vehicle to realize a predetermined behavior. The supporter unit generates and provides to respective main control systems information to be used at respective main control systems based on the current dynamic state of the vehicle. At respective main control systems, determination is made as to whether or not such information input from the adviser unit, the agent unit and the supporter unit (information other than the request of the driver) is to be reflected in the motion control of the vehicle, and to what extent, if to be reflected. Furthermore, the control target is corrected, and/or information is transmitted among respective control units. Since each main control system operates autonomously, the actuator of the power train, the actuator of brake device and the actuator of steering device are controlled eventually at respective control units based on the eventual driving target, braking target and steering target calculated by the sensed manipulation information of the driver, information input from the adviser unit, agent unit and supporter unit, and information transmitted among respective main control systems.

Specifically, the adviser unit generates information representing the degree of risk with respect to the vehicle operation property based on the frictional resistance (μ value) of the road on which the vehicle is running, the outdoor temperature and the like as the environmental information around the vehicle, and/or generates information representing the degree of risk with respect to the manipulation of the driver based on the fatigue level of the driver upon shooting a picture of the driver. Information representing the degree of risk is output to each main control system. This information representing the degree of risk is processed at the adviser unit so the information can be used at any of the main control systems. At each main control system, the process is carried out as to whether or not to reflect the information related to the input risk for the vehicle motion control, in addition to the request of the driver from the processing unit, and to what extent the information is to be reflected, and the like.

Specifically, the agent unit generates information to implement an automatic cruise function for the automatic drive of vehicle. The information to implement the automatic cruise function is output to each main control system. At each main control system, the process is carried out as to whether or not to reflect the input information to implement the automatic cruise function, in addition to the request of the driver from the processing unit, and to what extent the information is to be reflected, and the like.

Further preferably, the supporter unit identifies the current dynamic state of the vehicle, and generates information to modify the target value at each main control system. The information to modify the target value is output to each main control system. At each main control system, the process is carried out as to whether or not to reflect the input information to modify the target value based on the dynamic state for the vehicle motion control, in addition to the request of the driver from the processing unit, and to what extent the information is to be reflected, and the like.

As shown in FIG. 13, the basic control units of main control system (1), main control system (2) and main control system (3), and the support unit of the adviser unit, agent unit, and supporter unit are all configured so as to operate autonomously. Main control system (1) is designated as the PT (Power Train) system. Main control system (2) is designated as the ECB (Electronic Controlled Brake) system. Main control system (3) is designated as the STR (Steering) system. A portion of the adviser unit and the portion of the agent unit are designated as the DSS (Driving Support System). A portion of the adviser unit, a portion of the agent unit, and a portion of the supporter unit are designated as the VDM (Vehicle Dynamics Management) system.

Figure 14:
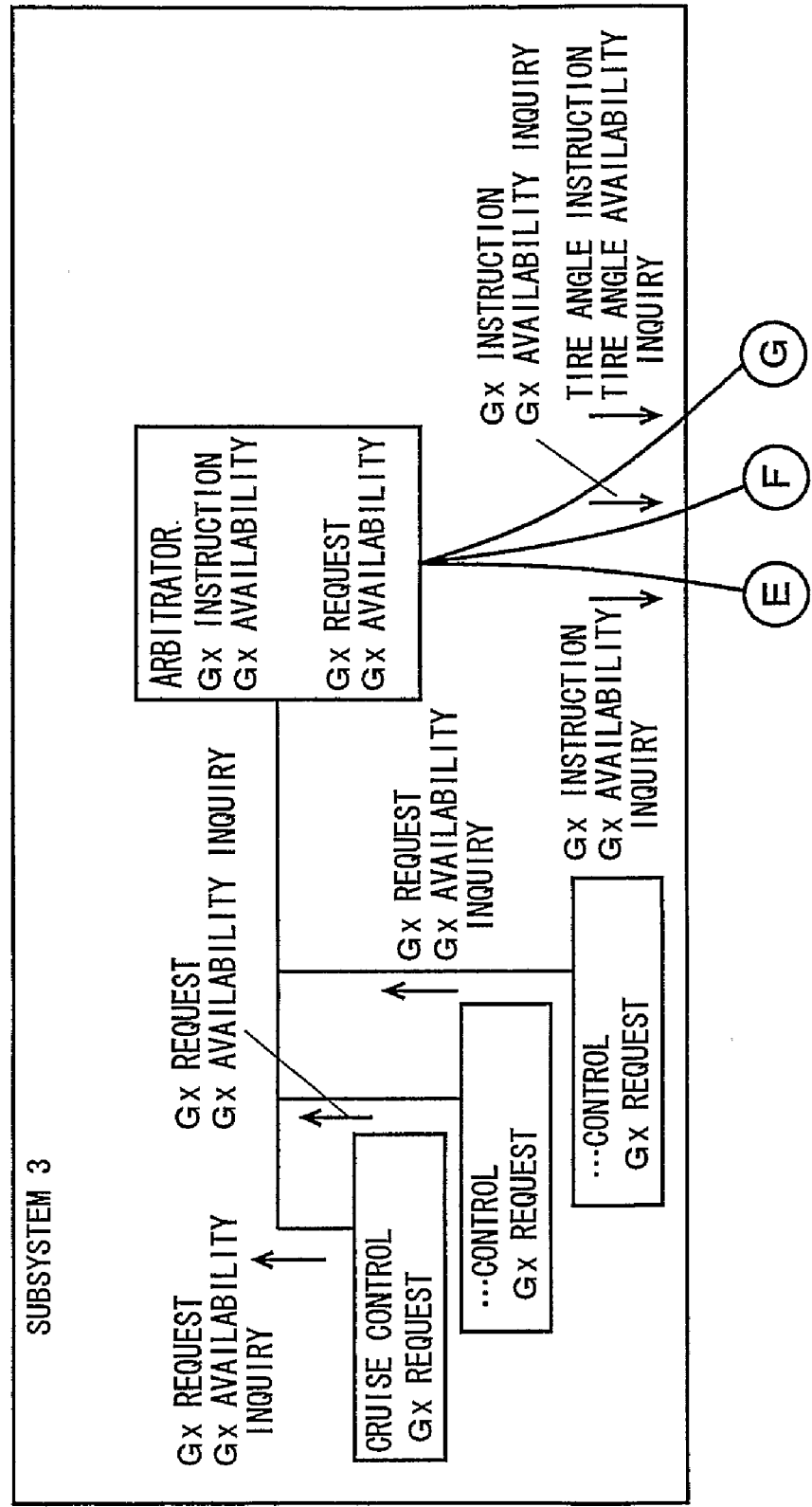
FIGS. 14-16 represent an implementation configuration of the vehicle integrated control system according to the second embodiment of the present invention.
Figure 15:
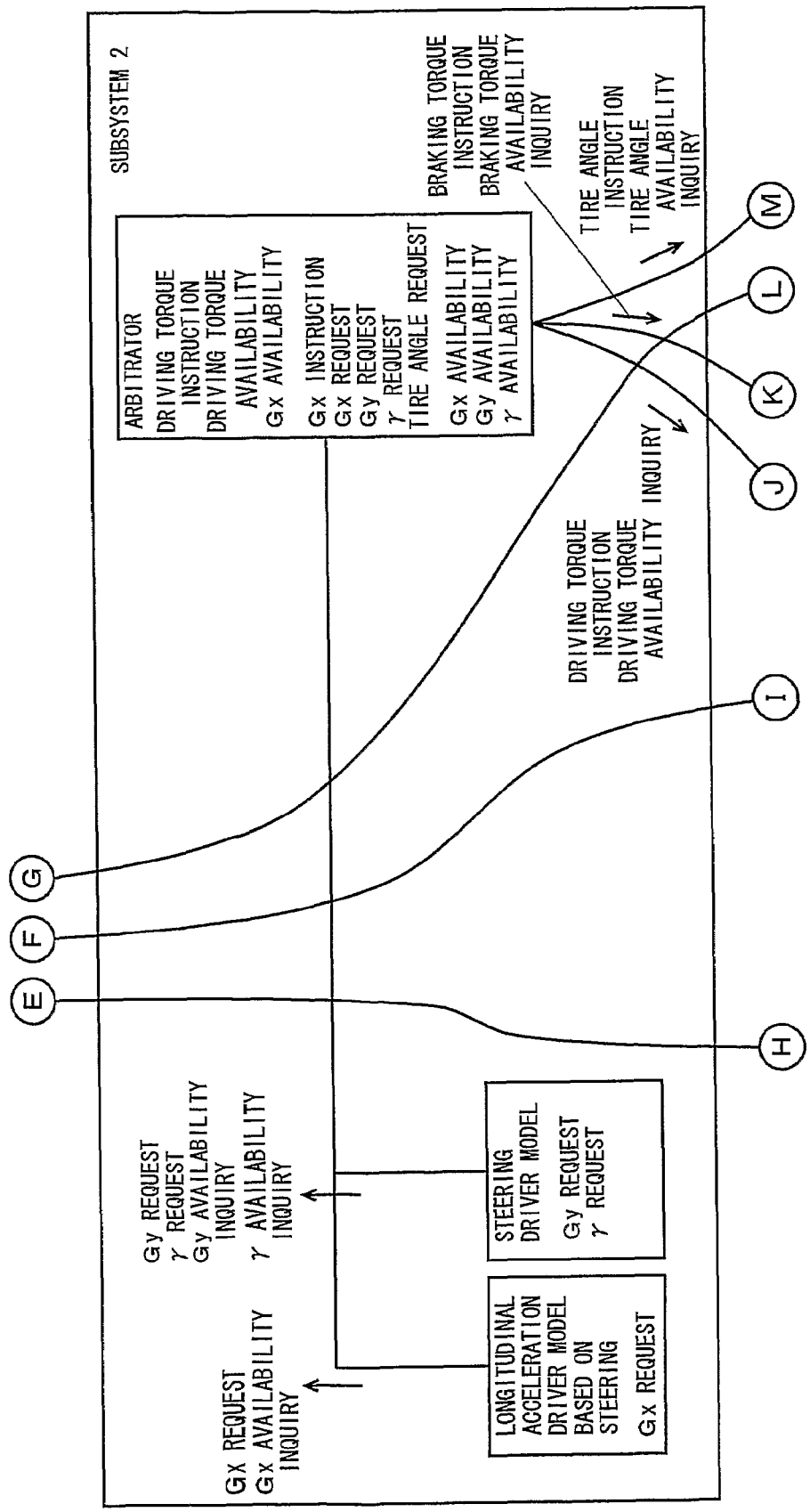
Figure 16:
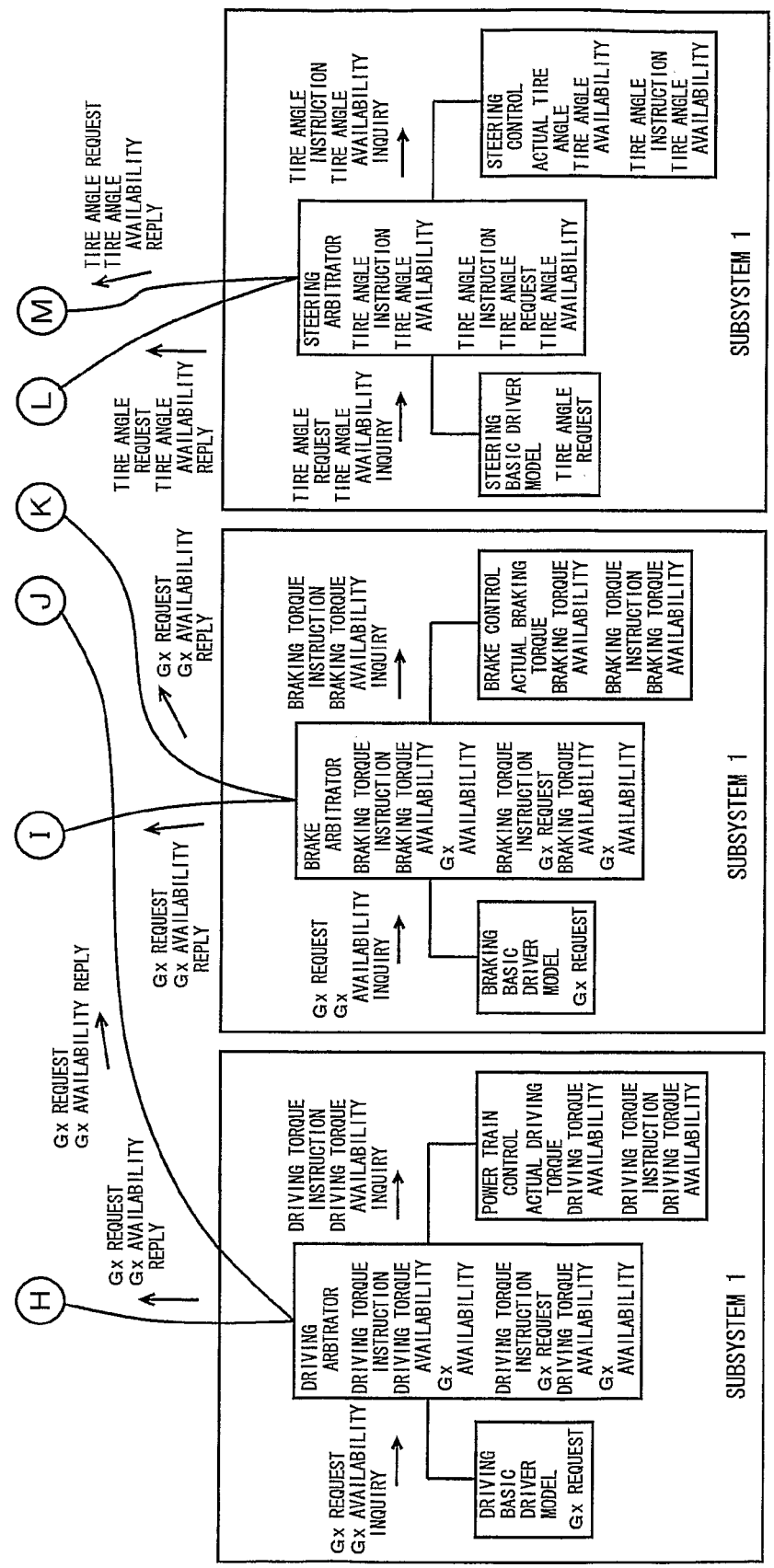

FIGS. 14-16 represent an implementation configuration of realizing the vehicle integrated control system of FIG. 13. FIGS. 14-16 correspond to FIGS. 3-5, respectively.

The vehicle integrated control system of the present invention is formed of a plurality of subsystems that operate autonomously and in parallel. The subsystems include arbitration units with respective arbitration functions. FIGS. 1 and 13 are directed to different control configurations. FIGS. 3-5 realize the different control configuration as difference in the arbitrator, as appreciated from comparison with FIGS. 14-16, respectively. Each subsystem is formed of a request unit generating a request towards the driving system, brake system and steering system of the vehicle based on various information, an arbitration unit arbitrating the requests generated at the request units of respective subsystems, and an output unit to provide an arbitrated target value. These request units, arbitration units, and output units are implemented by a software module realized by software.

By virtue of the above-described configuration, the control configuration of FIG. 2 can be modified to the control configuration of FIG. 13 to implement a different control configuration by just modifying the arbitration unit, using the same request unit and same output unit. In the case where the control function is divided into the three sections of a request unit, arbitration unit and output unit in each subsystem, the standard to divide the same appropriately is generally defined in a one-to-one correspondence. It is to be noted that the possibility of the request unit and output unit, in particular, can be processed as a fixed functional unit since they have a similar function between different subsystems. In other words, a significant modification in the control configuration, such as modification from FIG. 2 to FIG. 13 can be accommodated by modifying the logic of the arbitration unit and/or the method of connecting the arbitration units with each other. Once a system is built with the request unit, arbitration unit, and output unit divided appropriately, any subsequent modification can be accommodated by just modifying the section related to the arbitration unit such as connection and the like between the arbitration units. Thus, system modification can be facilitated.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. An integrated control system for vehicle control, comprising at least three subsystems, operating autonomously and in parallel, and dispensable of a hierarchical system for a level higher than the subsystem, the integrated control system comprising
   a sensing unit that senses and stores information relating to a vehicle state,
   wherein a first subsystem provides a basic control function, and comprises
   a first request unit that calculates a first control quantity based on at least part of the sensed information received from the sensing unit,
   a first arbitration unit that arbitrates the first control quantity received from the first request unit and at least a second control quantity received from a second arbitration unit of a second subsystem, and
   an output unit that controls an actuator of the vehicle based on the arbitration result of the first arbitration unit,
   wherein the second subsystem provides a stabilization control function, and comprises
   a second request unit that calculates a third control quantity based on at least part of the sensed information received from the sensing unit, and
   the second arbitration unit that arbitrates the third control quantity and a fourth control quantity received from a third arbitration unit of a third subsystem of the subsystems in order to output the second control quantity to the first arbitration unit of the first subsystem,
   wherein the third subsystem provides a driving support function, and comprises
   a third request unit that calculates a fifth control quantity based on at least part of the sensed information received from the sensing unit, and
   the third arbitration unit that arbitrates the fifth control quantity received from the fifth request unit in order to output the fourth control quantity to the second arbitration unit of the second subsystem.

2. The vehicle integrated control system according to claim 1, wherein each of the arbitration units includes a determining unit that determines priority of information.

3. The vehicle integrated control system according to claim 1, wherein each of the arbitration units includes a correcting unit that corrects information.

4. The vehicle integrated control system according to claim 1, Wherein each of the arbitration units includes a processor that processes information.

5. The vehicle integrated control system according to claim 1, wherein the first subsystem further comprises a driving system control subsystem, a brake system control subsystem, and a steering system control subsystem.

6. The vehicle integrated control system according to claim 1, wherein the third subsystem further comprises an automatic cruise subsystem controlling the vehicle for automatic cruising or pseudo automatic cruising of the vehicle.

7. The vehicle integrated control system according to claim 1, wherein the second subsystem further comprises a dynamic stabilization subsystem controlling the vehicle so as to stabilize a behavior state of the vehicle.

* * * * *